US012787037B2

(12) United States Patent
Zhang et al.

(10) Patent No.: US 12,787,037 B2
(45) Date of Patent: Nov. 3, 2026

(54) COMMUNICATION METHOD AND APPARATUS FOR ADDING TERMINAL DEVICE TO A MULTICAST SERVICE SESSION

(71) Applicant: HUAWEI TECHNOLOGIES CO., LTD., Shenzhen (CN)

(72) Inventors: Haisen Zhang, Beijing (CN); Bin Xu, Beijing (CN); Bingzhao Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 18/432,194

(22) Filed: Feb. 5, 2024

(65) Prior Publication Data

US 2024/0188104 A1 Jun. 6, 2024

Related U.S. Application Data

(63) Continuation of application No. PCT/CN2022/105769, filed on Jul. 14, 2022.

(30) Foreign Application Priority Data

Aug. 5, 2021 (CN) ......................... 202110897090.9

(51) Int. Cl.
*H04W 72/30* (2023.01)
*H04L 12/18* (2006.01)
(Continued)

(52) U.S. Cl.
CPC ........... *H04W 72/30* (2023.01); *H04L 12/185* (2013.01); *H04L 12/1881* (2013.01); *H04W 72/121* (2013.01); *H04W 76/20* (2018.02)

(58) Field of Classification Search
CPC ... H04W 72/30; H04W 72/121; H04W 76/20; H04W 88/06; H04W 76/30; H04W 4/06;
(Continued)

(56) References Cited

U.S. PATENT DOCUMENTS

2009/0245248 A1* 10/2009 Arberg .................. H04L 12/185 370/390
2011/0051646 A1* 3/2011 Rice ....................... H04L 65/611 370/312
(Continued)

FOREIGN PATENT DOCUMENTS

WO WO-2016124983 A1 * 8/2016 .............. H04W 4/06

OTHER PUBLICATIONS

3GPP TS 38.413, "3rd Generation Partnership Project; Technical Specification Group Radio Access Network; NG-RAN; NG Application Protocol (NGAP) (Release 16)", 3GPP Organizational Partners, Jul. 2021, V16.6.0, 473 pages.
(Continued)

*Primary Examiner* — Kiet Tang
(74) *Attorney, Agent, or Firm* — Maier & Maier, PLLC

(57) ABSTRACT

A communication method includes: obtaining first information from a first core network device, where the first information is used to request to add a first terminal device to a multicast service session corresponding to a first multicast service; and adding the first terminal device to a multicast service session corresponding to a second multicast service when a first condition is met, where the first condition includes that the first multicast service and the second multicast service are a same multicast service, and the second multicast service is provided by a second core network device. The first terminal device is added to the multicast service session corresponding to the second multicast service, so that service data of the second multicast
(Continued)

service can be simultaneously provided for terminal devices in two networks by using an established resource related to the second multicast service.

18 Claims, 8 Drawing Sheets

(51) Int. Cl.
*H04W 72/121* (2023.01)
*H04W 76/20* (2018.01)

(58) Field of Classification Search
CPC ....... H04W 4/20; H04W 76/40; H04W 76/11; H04L 12/185; H04L 12/1881; H04L 12/189; H04L 61/5069; H04L 67/141
See application file for complete search history.

(56) References Cited

U.S. PATENT DOCUMENTS

2016/0337817 A1 11/2016 Malladi et al.
2018/0103403 A1* 4/2018 Van Lieshout ....... H04W 84/12
2019/0124623 A1 4/2019 Xu et al.
2020/0120546 A1 4/2020 Zhang et al.
2021/0219106 A1 7/2021 Li et al.
2022/0217508 A1* 7/2022 Xiong ................ H04L 61/5007
2022/0408162 A1* 12/2022 Jia ...................... H04N 21/6408

OTHER PUBLICATIONS

Huawei, "New SID: Architectural Enhancements for 5G Multicast-Broadcast Services Phase 2", 3GPP TSG-WG SA2 Meeting #146E e-meeting, S2-2106086, Aug. 16-27, 2021, 3 pages.
Huawei et al., "Leftover Issue for MBS Session Activation and Deactivation", 3GPP TSG-SA2 Meeting # 147E (e-meeting), S2-2107475, Oct. 18-22, 2021, 8 pages.
Huawei et al., "NR Multicast Broadcast Enhancements", 3GPP TSG RAN Rel-18 Workshop, RWS-210446, Jun. 28-Jul. 2, 2021, 4 pages.
RAN3 Chairman, "List of E-mail Discussions", 3GPP TSG-RAN WG3 #112-e, Draft R3-211559, May 17-27, 2021, 6 pages.

* cited by examiner

COMMUNICATION METHOD AND APPARATUS FOR ADDING TERMINAL DEVICE TO A MULTICAST SERVICE SESSION

CROSS-REFERENCE TO RELATED APPLICATIONS

This application is a continuation of International Application No. PCT/CN2022/105769, filed on Jul. 14, 2022, which claims priority to Chinese Patent Application No. 202110897090.9, filed on Aug. 5, 2021. The disclosures of the aforementioned applications are hereby incorporated by reference in their entireties.

TECHNICAL FIELD

The embodiments relate to the field of communication technologies, a communication method, and an apparatus.

BACKGROUND

In a 5G new radio (NR) system, a network co-construction and sharing technology may be used to enable a plurality of operators to share network infrastructure. A main application of the network co-construction and sharing technology includes radio access network (RAN) sharing. RAN sharing means that one RAN may be connected to core network nodes of a plurality of operators. The plurality of operators may collaborate to co-construct the RAN. Alternatively, one operator may independently construct the RAN, and another operator may rent the RAN network of the operator.

In a RAN sharing scenario, how to save network resources and improve transmission efficiency is an urgent problem to be resolved.

SUMMARY

The embodiments provide a communication method and an apparatus to save resources and improve transmission efficiency.

According to a first aspect, the embodiments provide a communication method. The method is applicable to a scenario in which a session is established between an access network device and a terminal device. The method is performed by the access network device or a chip or a module in the access network device. An example in which the access network device is an execution body is used herein for description. The method includes: The access network device obtains first information from a first core network device, where the first information is used to request to add a first terminal device to a multicast service session corresponding to a first multicast service; and adds the first terminal device to a multicast service session corresponding to a second multicast service when a first condition is met, where the first condition includes that the first multicast service and the second multicast service are a same multicast service, and the second multicast service is provided by a second core network device.

When the first multicast service and the second multicast service are the same multicast service, the first terminal device is added to the multicast service session corresponding to the second multicast service, so that service data of the second multicast service can be simultaneously provided for terminal devices in two networks by using an established resource related to the second multicast service. In this way, same NG resources and air interface resources are shared for same multicast services from the two core networks, to save resources and improve data transmission efficiency.

The method further includes: sending second information to the first core network device, where the second information indicates not to establish a first data transmission channel with the first core network device, and the first data transmission channel is used to transmit service data of the first multicast service.

The method further includes: sending third information to the first core network device, where the third information indicates that a first data transmission channel established with the first core network device is in an inactive state, and the first data transmission channel is used to transmit service data of the first multicast service.

According to the foregoing method, the service data may not be obtained first by using a first core network, and the access network device receives data only from a second core network, to save NG interface resources and improve data transmission efficiency.

The method further includes: sending a first user identifier to the first terminal device, where the first user identifier is used to scramble first scheduling information, and the first scheduling information is used to schedule service data of the second multicast service, where the first user identifier is the same as a second user identifier, the second user identifier is a user identifier sent to a second terminal device, and the second terminal device belongs to the second core network device.

The method further includes: sending first configuration information to the first terminal device, where the first configuration information includes configuration information of a second multicast radio bearer, the second multicast radio bearer is used to transmit service data of the second multicast service to a second terminal device, and the second multicast radio bearer is further used to transmit the service data of the second multicast service to the first terminal device.

According to the foregoing method, the first terminal device and the second terminal device may receive data by using a same multicast radio bearer, to save air interface resources and improve data transmission efficiency.

The first information includes a first identifier corresponding to the first multicast service; and that the first condition includes that the first multicast service and the second multicast service are a same multicast service includes: the first multicast service and the second multicast service are the same multicast service if the first identifier matches a second identifier corresponding to the second multicast service.

The first identifier is a first multicast service identifier corresponding to the first multicast service in the first core network device; the first identifier is a first multicast service session identifier corresponding to the first multicast service in the first core network device; the first identifier is a first internet protocol IP multicast group address or a temporary mobile group identity corresponding to the first multicast service in the first core network device; or the first identifier is an identifier corresponding to the first multicast service in a service server or another identifier allocated by a service server to the first multicast service.

According to the foregoing method, the access network device may identify that the first multicast service and the second multicast service are the same multicast service. In this way, same NG resources and/or air interface resources may be further shared for same multicast services from the two core networks.

The method further includes: receiving first release information from the second core network device, where the first release information indicates to release a second data transmission channel, and the second data transmission channel is used to transmit service data of the second multicast service; and sending fifth information or sixth information to the first core network device, where the fifth information is used to trigger establishment of the first data transmission channel, and the sixth information is used to activate the first data transmission channel.

The first release information includes a release cause; and before the sending fifth information or sixth information to the first core network device, the method further includes: determining that the release cause is any one of the following: a request is made to convert the second multicast service from transmission in a multicast manner to transmission in a unicast manner; a request is made to convert the second multicast service into a unicast service; there is no terminal device that receives the service data of the second multicast service in a network corresponding to the second core network device; and a quantity of terminal devices that receive the service data of the second multicast service in the network corresponding to the second core network device is less than or equal to a threshold.

According to the foregoing method, the first core network device may obtain a cause for releasing the second multicast service by the access network device, to determine a manner of providing a service for the first terminal device.

The method further includes: establishing a first multicast radio bearer corresponding to the first multicast service based on first quality of service flow information; or updating a second multicast radio bearer based on first quality of service flow information, where the first multicast radio bearer is used to transmit the service data of the first multicast service to the first terminal device, and the first quality of service flow information is from the first core network device; and the second multicast radio bearer is used to transmit the service data of the second multicast service to the second terminal device, and an updated second multicast radio bearer is used to transmit the service data of the first multicast service to the first terminal device.

The method further includes: sending third configuration information to the first terminal device, where the third configuration information includes a third user identifier, the third user identifier is used to scramble second scheduling information, and the second scheduling information is used to schedule the service data of the first multicast service.

The third configuration information further includes configuration information of the first multicast radio bearer.

According to the foregoing method, when the first core network continues the first multicast service, the first terminal device re-establishes or updates the second multicast radio bearer to the first multicast radio bearer.

The method further includes: sending a first packet number to the first core network device, where the first packet number is a packet number of a last data packet that is sent to the first terminal device and that belongs to the first multicast service, or the first packet number is a largest packet number in at least one packet number corresponding to at least one buffered data packet, and the at least one data packet is a data packet that is to be sent to the first terminal device and that belongs to the first multicast service.

It may be understood that due to a limitation on a data packet number, when the data packet number reaches a maximum value, for example, 4095 (corresponding to a 10-bit number length), a subsequent packet starts from 0 again. Therefore, the largest packet number essentially refers to a packet numbered last. For example, in three data packets, if a number of a first data packet is 4094, a number of a second data packet is 4095, and a number of a third data packet is 0 ((4095+1) mod 4096, where mod represents modulo), the number of the third data packet is considered as the largest packet number.

The method further includes: receiving a data packet that belongs to the first multicast service from the first core network device, where a start data packet in the received data packet is a second data packet; and there is an interval of N data packets between the second data packet and a third data packet, the third data packet is a data packet obtained from a service server when the first core network device receives the fifth information or the sixth information, and N is an integer greater than 0; or a corresponding time interval between the second data packet and a third data packet is preset duration.

The preset duration is configured by the access network device, the preset duration is determined by the first core network device, or the preset duration is determined based on a first delay and a second delay, the first delay is a transmission delay between the access network device and the first core network device, and the second delay is a transmission delay between the access network device and the second core network device.

When a core network device that provides the data of the first multicast service is changed from the second core network device to the first core network device, a packet loss may be avoided, and service continuity may be ensured.

According to a second aspect, the embodiment further provides a communication apparatus. The communication apparatus implements any method provided in the first aspect. The communication apparatus may be implemented by hardware or may be implemented by hardware by executing corresponding software. The hardware or the software includes one or more units or modules corresponding to the foregoing function.

In a possible implementation, the communication apparatus includes a processor, and the processor is configured to support the communication apparatus in performing a corresponding function in the foregoing method. The communication apparatus may further include a memory, and the memory may be coupled to the processor, and store program instructions and data that are necessary for the communication apparatus. Optionally, the communication apparatus further includes an interface circuit, and the interface circuit is configured to support communication between the communication apparatus and another device.

In a possible implementation, the communication apparatus may be an access network device or a chip or a module in an access network device.

In a possible implementation, the communication apparatus includes corresponding functional modules respectively configured to implement the steps in the foregoing method. The function may be implemented by hardware or may be implemented by hardware by executing corresponding software. The hardware or the software includes one or more modules corresponding to the foregoing function.

In a possible implementation, a structure of the communication apparatus includes a processing unit and a communication unit. These units may perform corresponding functions in the foregoing method examples. For details, refer to the descriptions in the method provided in the first aspect. Details are not described herein.

According to a third aspect, the embodiment provides a communication method. The method is applicable to a scenario in which a session is established between an access network device and a terminal device. The method is performed by a first core network device or a chip or a module in a first core network device. An example in which the first core network device is an execution body is used herein for description. The method includes: The first core network device sends first information to the access network device, where the first information is used to request to add a first terminal device to a multicast service session corresponding to a first multicast service; and receives second information or third information from the access network device when the first terminal device joins a multicast service session corresponding to a second multicast service, where the first multicast service and the second multicast service are a same multicast service, and the second multicast service is provided by a second core network device; the second information indicates not to establish a first data transmission channel with the first core network device, and the first data transmission channel is used to transmit service data of the first multicast service; and the third information indicates that the first data transmission channel established with the first core network device is in an inactive state, and the first data transmission channel is used to transmit the service data of the first multicast service.

The method further includes: receiving fifth information or sixth information from the access network device, where the fifth information is used to trigger establishment of the first data transmission channel, and the sixth information is used to activate the first data transmission channel.

The method further includes: receiving a first packet number from the access network device, where the first packet number is a packet number of a last data packet that is sent by the access network device to the first terminal device and that belongs to the first multicast service, or the first packet number is a largest packet number in at least one packet number corresponding to at least one data packet buffered by the access network device, and the at least one data packet is a data packet that is to be sent to the first terminal device and that belongs to the first multicast service; and using a data packet corresponding to the first packet number as a start data packet to be sent to the first terminal device.

The method further includes: sending a data packet that belongs to the first multicast service to the access network device, where a start data packet in the data packet is a second data packet; and there is an interval of N data packets between the second data packet and a third data packet, the third data packet is a data packet obtained from a service server when the first core network device receives the fifth information or the sixth information, and N is an integer greater than 0; or a corresponding time interval between the second data packet and a third data packet is preset duration.

The preset duration is configured by the access network device, the preset duration is determined by the first core network device, or the preset duration is determined based on a first delay and a second delay, the first delay is a transmission delay between the access network device and the first core network device, and the second delay is a transmission delay between the access network device and the second core network device.

According to a fourth aspect, the embodiment further provides a communication apparatus. The communication apparatus implements any method provided in the second aspect. The communication apparatus may be implemented by hardware or may be implemented by hardware by executing corresponding software. The hardware or the software includes one or more units or modules corresponding to the foregoing function.

In a possible implementation, the communication apparatus includes a processor, and the processor is configured to support the communication apparatus in performing a corresponding function in the foregoing method. The communication apparatus may further include a memory, and the memory may be coupled to the processor, and store program instructions and data that are necessary for the communication apparatus. Optionally, the communication apparatus further includes an interface circuit, and the interface circuit is configured to support communication between the communication apparatus and another device.

In a possible implementation, the communication apparatus may be a core network device or a chip or a module in a core network device.

In a possible implementation, the communication apparatus includes corresponding functional modules respectively configured to implement the steps in the foregoing method. The function may be implemented by hardware or may be implemented by hardware by executing corresponding software. The hardware or the software includes one or more modules corresponding to the foregoing function.

In a possible implementation, a structure of the communication apparatus includes a processing unit and a communication unit. These units may perform corresponding functions in the method examples. For details, refer to the descriptions in the method provided in the second aspect. Details are not described herein.

According to a fifth aspect, a communication apparatus is provided, includes a processor and an interface circuit, and optionally, further includes a memory. The interface circuit is configured to: receive a signal from a communication apparatus other than the communication apparatus, and transmit the signal to the processor, or send a signal from the processor to a communication apparatus other than the communication apparatus. The processor is configured to execute a computer program or instructions stored in the memory, to implement the method in any possible implementation of the first aspect.

According to a sixth aspect, a communication apparatus is provided, includes a processor and an interface circuit, and optionally, further includes a memory. The interface circuit is configured to: receive a signal from a communication apparatus other than the communication apparatus, and transmit the signal to the processor, or send a signal from the processor to a communication apparatus other than the communication apparatus. The processor is configured to execute a computer program or instructions stored in the memory, to implement the method in any possible implementation of the second aspect.

According to a seventh aspect, a non-transitory computer-readable storage medium is provided. The non-transitory computer-readable storage medium stores a computer program or instructions. When the computer program or the instructions are run on a computer, the computer is enabled to implement the method in any possible implementation of the first aspect.

According to an eighth aspect, a non-transitory computer-readable storage medium is provided. The non-transitory computer-readable storage medium stores a computer program or instructions. When the computer program or the instructions are run on a computer, the computer is enabled to implement the method in any possible implementation of the second aspect.

According to a ninth aspect, a computer program product storing computer-readable instructions is provided. When the computer-readable instructions are run on a computer, the computer is enabled to implement the method in any possible implementation of the first aspect.

According to a tenth aspect, a computer program product storing computer-readable instructions is provided. When the computer-readable instructions are run on a computer, the computer is enabled to implement the method in any possible implementation of the second aspect.

According to an eleventh aspect, a chip is provided. The chip includes a processor and may further include a memory. A computer program or instructions stored in the memory are executed to enable the chip to implement the method in any possible implementation of the first aspect.

According to a twelfth aspect, a chip is provided. The chip includes a processor and may further include a memory. A computer program or instructions stored in the memory are executed to enable the chip to implement the method in any possible implementation of the second aspect.

According to a thirteenth aspect, a communication apparatus is provided, and includes a module configured to implement the method in any possible implementation of the first aspect.

According to a fourteenth aspect, a communication apparatus is provided, and includes a module configured to implement the method in any possible implementation of the second aspect.

According to a fifteenth aspect, a communication system is provided. The system includes the apparatus (for example, the access network device) according to the second aspect and the apparatus (for example, the first core network device) according to the fourth aspect.

DETAILED DESCRIPTION OF THE EMBODIMENTS

Figure 1:
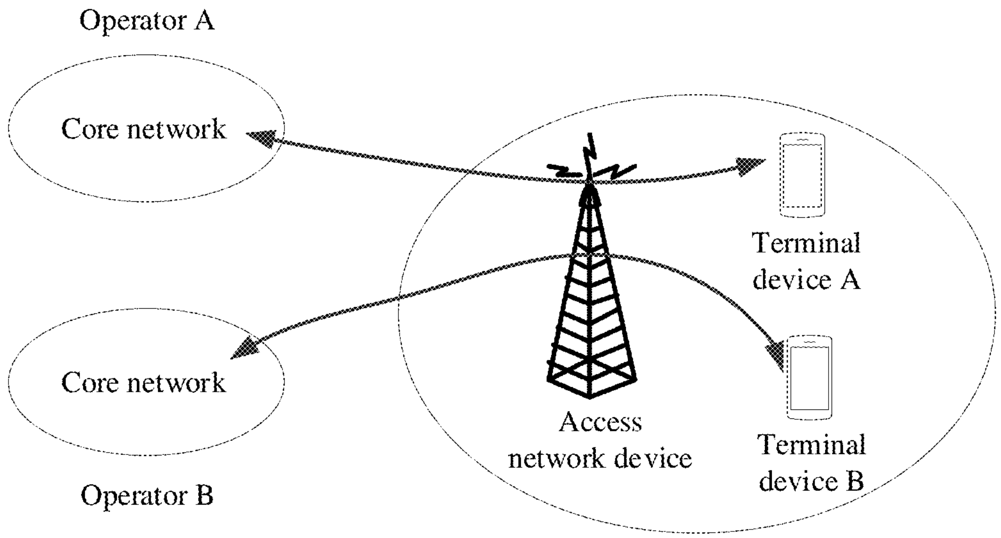
FIG. 1 is a schematic diagram of a network architecture.

The following describes in detail the embodiments with reference to the accompanying drawings.

The embodiments may be applied to various mobile communication systems, for example, an NR system, a global system for mobile communications (GSM), a long term evolution (LTE) system, a future communication system, and another communication system. This is not limited herein.

In the embodiments, interaction between a terminal device, an access network device, and a core network device is used as an example for description. It should be noted that the method provided in the embodiments may be applied not only to interaction between the terminal device and a network side, but also to interaction between any two devices, for example, device-to-device (D2D) communication. This is not limited in the embodiments.

In the embodiments, the terminal device may be briefly referred to as a terminal and is a device with a wireless transceiver function or a chip that may be disposed in the device. The terminal device may also be referred to as user equipment (UE), an access terminal, or the like. In actual application, the terminal device in the embodiments may be a mobile phone, a tablet computer (Pad), a computer with a wireless transceiver function, a virtual reality (VR) terminal, an augmented reality (AR) terminal, a wireless terminal in industrial control, or the like. In the embodiments, an apparatus configured to implement a function of the terminal device may be a terminal device; or may be an apparatus that can support the terminal device in implementing the function, for example, a chip system. The apparatus may be installed in the terminal device or used in matching with the terminal device.

The access network device may be a radio access device in various standards in a wireless network. For example, the access network device may be a RAN node that connects the terminal device to the wireless network and may also be referred to as a RAN device or a base station. Some examples of the access network device are a next-generation NodeB (gNodeB), a transmission reception point (TRP), an evolved NodeB (eNB), a radio network controller (RNC), and the like. In a network structure, the access network device may include a central unit (CU) node or a distributed unit (DU) node or include a CU node and a DU node. When the access network device includes a CU and a DU, a plurality of DUs may be centrally controlled by one CU. In the embodiments, an apparatus configured to implement a function of the access network device may be an access network device; or may be an apparatus that can support the access network device in implementing the function, for example, a chip system. The apparatus may be installed in the access network device or used in matching with the access network device.

The core network device may be a device configured to manage access and mobility of the terminal device, for example, may be an access and mobility management function (AMF) network element, a session management function (SMF) network element, a multicast broadcast (MB)-SMF network element, a user plane function (UPF), or an MB-UPF, or may be a mobility management entity (MME) network element. This is not limited.

The embodiments may be applied to a RAN sharing scenario. In the RAN sharing scenario, a radio access network or a radio access network and some core networks may be shared by a plurality of operators. There are a plurality of architectures for RAN sharing. The embodiments may relate to a multi-operator core network (MOCN) architecture.

FIG. 1 is a schematic diagram of a network architecture. In FIG. 1, one RAN may be connected to core network nodes of at least two operators, that is, is shared by the at least two operators. In FIG. 1, an example in which an operator A and an operator B share a RAN is used for description. In the network architecture shown in FIG. 1, a plurality of operators share an access network device, and share a cell of the access network device. However, each operator has an independent core network. The access network device separately establishes an SI interface connection or a next generation (NG) interface connection to the core network of each operator, and the access network device may provide a service for terminal devices of the plurality of operators. In this sharing mode, the core network is independent. Configuration management, alarm management, a performance indicator, and the like need to be managed by a primary operator. Some performance indicators may be used to distinguish between public land mobile networks (PLMNs). In a RAN sharing technology, the plurality of operators may simultaneously use the access network device, and the access network device may share one or more carrier segments of different operators to form a continuous high-bandwidth shared carrier, to reduce infrastructure and device costs.

In the embodiments, in the RAN sharing scenario, a multicast service may be transmitted to terminal devices of different operators by using an access network device. The multicast service may include a multicast broadcast service (MBS) and may be applicable to a service oriented to a plurality of terminal devices, for example, live broadcast, scheduled program playing, weather warning, and internet of vehicles communication.

When the access network device transmits service data of the multicast service, in a possible implementation, a dedicated bearer may be established for the terminal device, to transmit data to the terminal device in a unicast manner. In another possible implementation, a dedicated bearer for the multicast service may be established, to transmit data to the plurality of terminal devices in a multicast manner. In this way, air interface resources can be saved, spectrum utilization can be improved, and transmission efficiency can be improved.

Figure 2A:
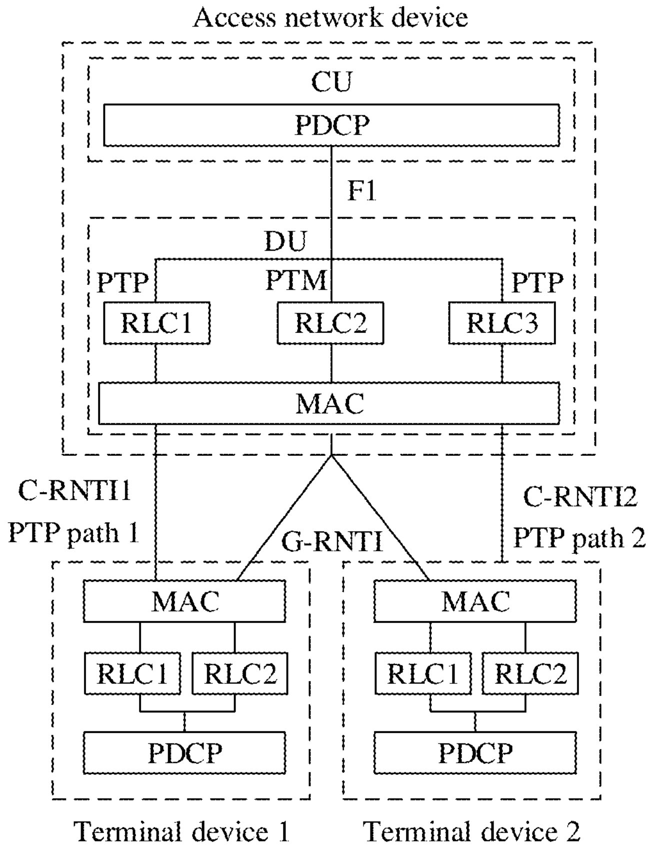
FIG. 2(*a*) to FIG. 2(*c*) are schematic diagrams of protocol architectures according to an embodiment.
Figure 2B:
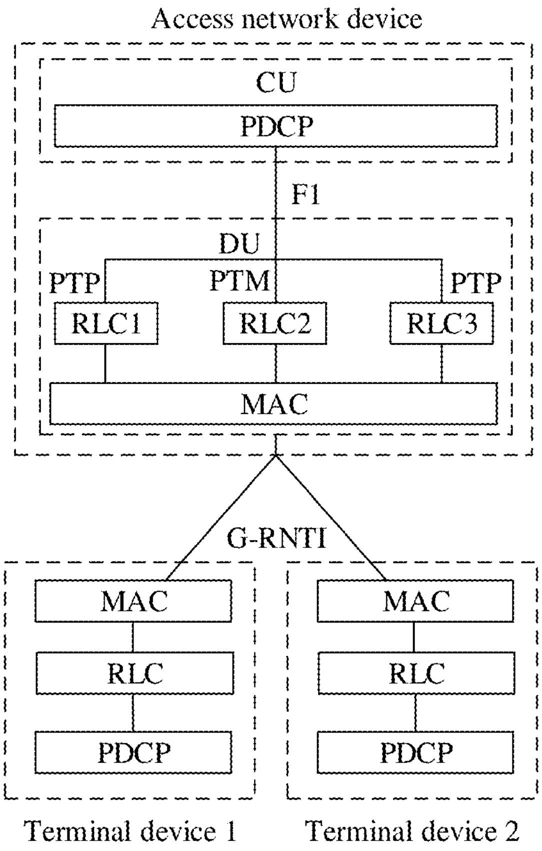
Figure 2C:
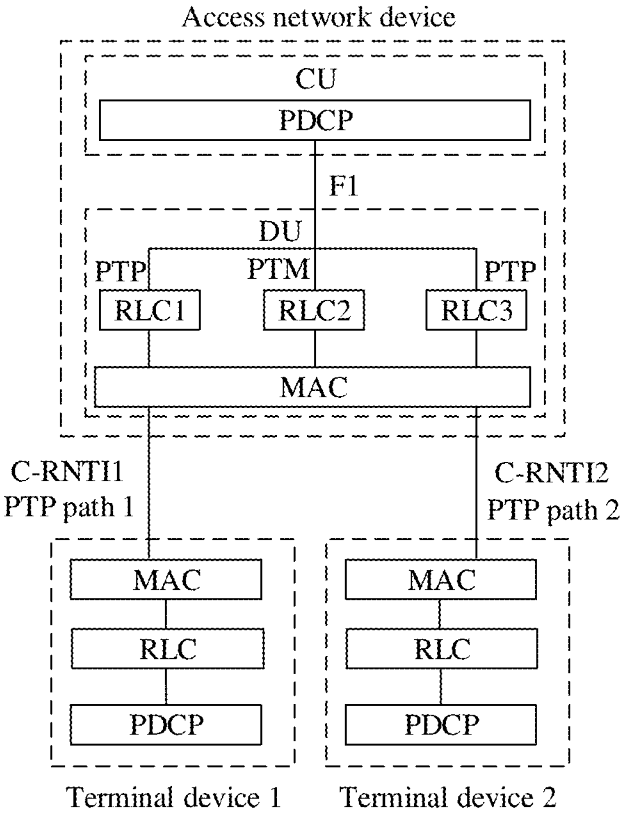

FIG. 2(*a*) to FIG. 2(*c*) are schematic diagrams of protocol architectures according to an embodiment. With reference to FIG. 2(*a*) to FIG. 2(*c*), when an access network device performs multicast transmission, a data packet in a packet data convergence protocol (PDCP) entity is transmitted to a media access control (MAC) entity through a radio link control (RLC) entity, and then the data packet is sent through a physical layer. A plurality of terminal devices receive the data packet. If a point-to-multipoint (PTM) transmission manner is used, the terminal device may monitor a group radio network temporary identifier (G-RNTI), and the data packet is sent to the terminal device through a PTM path, a PTM branch, a PTM leg, or an entity used for PTM transmission. If a point-to-point (PTP) transmission manner is used, the terminal device may monitor a cell radio network temporary identifier (C-RNTI), and the data packet is sent to the terminal device through a PTP path, a PTP branch, a PTP leg, or an entity used for PTP transmission. The path, the branch, the leg, or the entity is a schematic description of a transmission path in the corresponding transmission manner. This is not limited. In the embodiments, an internal protocol stack structure of the access network device is not limited. FIG. 2(*a*) to FIG. 2(*c*) are merely examples for description, and do not represent a limitation on the protocol stack structure.

In FIG. 2(*a*), a split MRB is configured for the terminal device. A terminal device 1 is used as an example. A PDCP entity of the terminal device 1 is connected to an RLC1 entity and an RLC2 entity. The RLC1 entity may correspond to a PTP path, and the RLC2 entity may correspond to a PTM path. The PTP path may include the PDCP entity of the access network device, an RLC1 entity of the access network device, the MAC entity of the access network device, a MAC entity of the terminal device, the RLC1 entity of the terminal device, and the PDCP entity of the terminal device. The PTM path may include the PDCP entity of the access network device, an RLC2 entity of the access network device, the MAC entity of the access network device, the MAC entity of the terminal device, the RLC2 entity of the terminal device, and the PDCP entity of the terminal device. For a terminal device 2, a PTP path may include the PDCP entity of the access network device, an RLC3 entity of the access network device, the MAC entity of the access network device, a MAC entity of the terminal device, an RLC1 entity of the terminal device, and a PDCP entity of the terminal device. A PTM path may be similar to that of the terminal device 1. Details are not described herein.

In FIG. 2(*b*), an MRB with only a PTM path (MRB with PTM leg only) is configured for the terminal device and may be used to receive multicast data. The PTM path may include the PDCP entity of the access network device, an RLC2 entity of the access network device, the MAC entity of the access network device, a MAC entity of the terminal device, an RLC entity of the terminal device, and a PDCP entity of the terminal device. Although the access network device may include an RLC1 entity and an RLC3 entity, because the RLC1 entity and the RLC3 entity are not associated with the PTM path, the RLC1 entity and the RLC3 entity may not be used, or the RLC1 entity and the RLC3 entity may not be configured. This is not limited.

In FIG. 2(*c*), an MRB with only a PTP path (MRB with PTP leg only) is configured for the terminal device.

Figure 3:
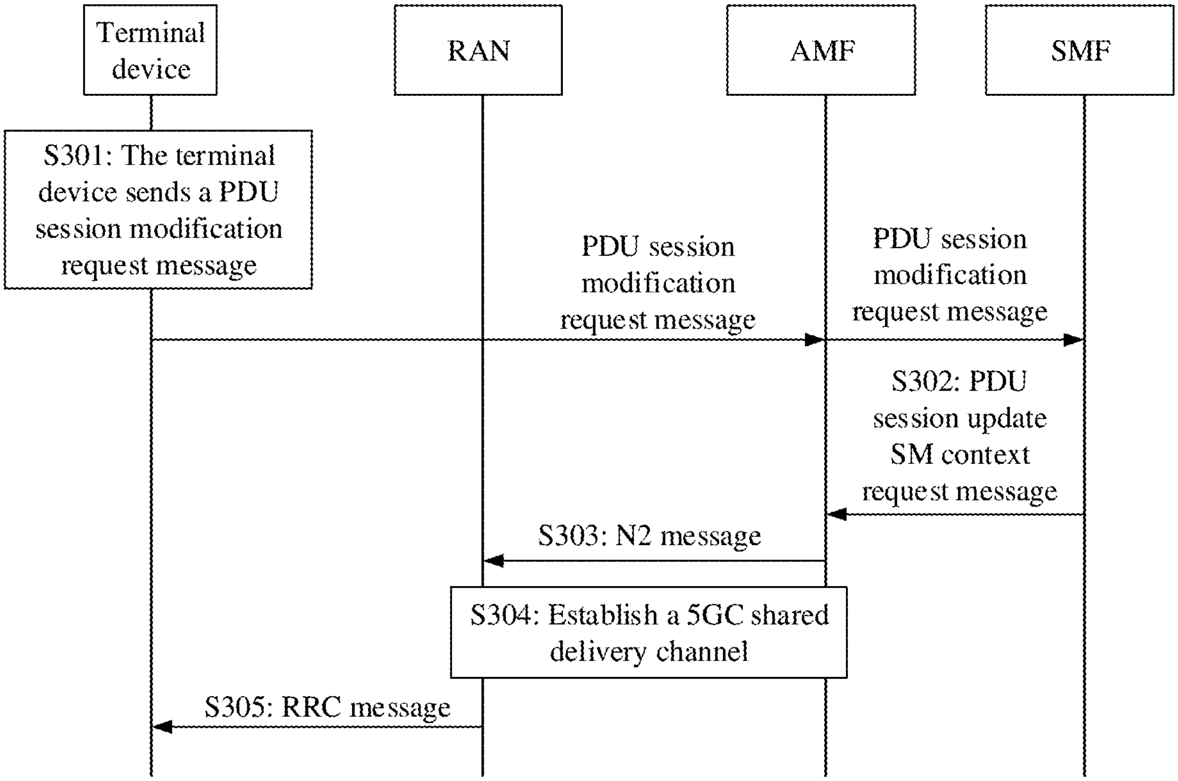
FIG. 3 is a schematic flowchart of joining a multicast session by a terminal device.

In the RAN sharing scenario, a multicast service process is the same as a process in a RAN non-sharing scenario. As shown in FIG. 3, a multicast service session establishment process may include the following procedures.

S301: A terminal device sends a protocol data unit (PDU) session modification request message.

The message includes an MBS session identifier, and the MBS session identifier corresponds to one multicast service (MBS) session. One multicast service session corresponds to one multicast service. The MBS session identifier may be obtained by the terminal device by using a service announcement message.

The MBS session identifier may indicate a multicast service (that is, a multicast group) that the terminal device expects to join, that is, the message may be used to request to join the multicast service session corresponding to the MBS session identifier. The message is a non-access stratum (NAS) message and is forwarded by an AMF to an SMF.

It should be noted that in a network such as 5G, before multicast service data is transmitted, a corresponding PDU session needs to be established first, and subsequent multicast data that needs to be transmitted needs to be carried by using the PDU session.

S302: The SMF sends a PDU session update session management (SM) context request message to the AMF.

The message may include the MBS session identifier, N2 SM information (information), and an N1 SM container. The N2 SM information may include a PDU session identifier, the MBS session identifier, PDU session update information, and correspondence information between a unicast quality of service (QOS) flow and a multicast QoS flow. The N1 SM container includes a PDU session modification command.

S303: The AMF sends an N2 message to a RAN.

The N2 message includes a PDU session modification request, and the PDU session modification request includes multicast service session information and PDU session modification information. If the RAN does not support multicast transmission between a core network and the RAN, 5G core (5GC) individual delivery is used over an NG interface. Otherwise, 5GC shared delivery is used.

S304 (optional): Establish a 5GC shared delivery channel if no shared delivery channel is established.

A process of establishing the 5GC shared delivery channel may include the following steps:

Step a: The RAN sends an N2 MBS session request message (session request message) to the AMF.

The message includes the MBS session identifier and the N2 SM information. If the RAN uses point-to-point shared delivery, the RAN provides a downlink address identifier, that is, access network (AN) tunnel information, in the message.

Step b: The AMF sends an N2 MBS session response message to the RAN.

The message includes the MBS session identifier and the N2 SM information. The N2 SM information includes the MBS session identifier. If no downlink address is provided in step a, the message further includes a downlink data transmission address used for multicast shared delivery between an MB-UPF and the RAN.

The 5GC shared delivery channel is established by using the foregoing process.

S305: The RAN sends a radio resource control (RRC) message to the terminal device.

The RRC message is used to establish a radio resource bearer for the MBS session, and the RRC message includes the N1 SM container.

In the foregoing process, the terminal device joins the multicast service session corresponding to a multicast service, and a network side may transmit service data of the multicast service to the terminal device. When the terminal device does not need to receive the service data of the multicast service, the terminal device may further initiate a procedure of leaving the session corresponding to the multicast service. A process is not described.

The embodiments may relate to a multicast service. The multicast service is sometimes also referred to as a multicast service and is collectively referred to as a multicast service in the embodiments. In the embodiments, the multicast service may be identified by using a multicast service identifier or a multicast service identifier, that is, for each multicast service, there is a unique multicast service identifier or multicast service identifier for representation. There is a one-to-one mapping relationship between the multicast/multicast service identifier and a multicast/multicast service session identifier. Therefore, the multicast/multicast service session identifier may also indicate the multicast service indicated by the multicast/multicast service identifier. In an implementation, the multicast/multicast service session identifier may be an internet protocol (IP) multicast group address or a temporary mobile group identity (TMGI). The TMGI may include a PLMN identifier and a multicast/multicast service identifier. The PLMN identifier represents a PLMN to which the TMGI belongs. The multicast/multicast service identifier is used to identify a multicast service in the PLMN. The multicast/multicast service identifier may be briefly referred to as a service identifier. In the embodiments, for ease of description, the multicast service identifier and the multicast service session identifier may be used as examples for description. If no descriptions are provided, the multicast service identifier may alternatively be replaced with the multicast service identifier, and the multicast service session identifier may alternatively be replaced with the multicast service session identifier.

Figure 4:
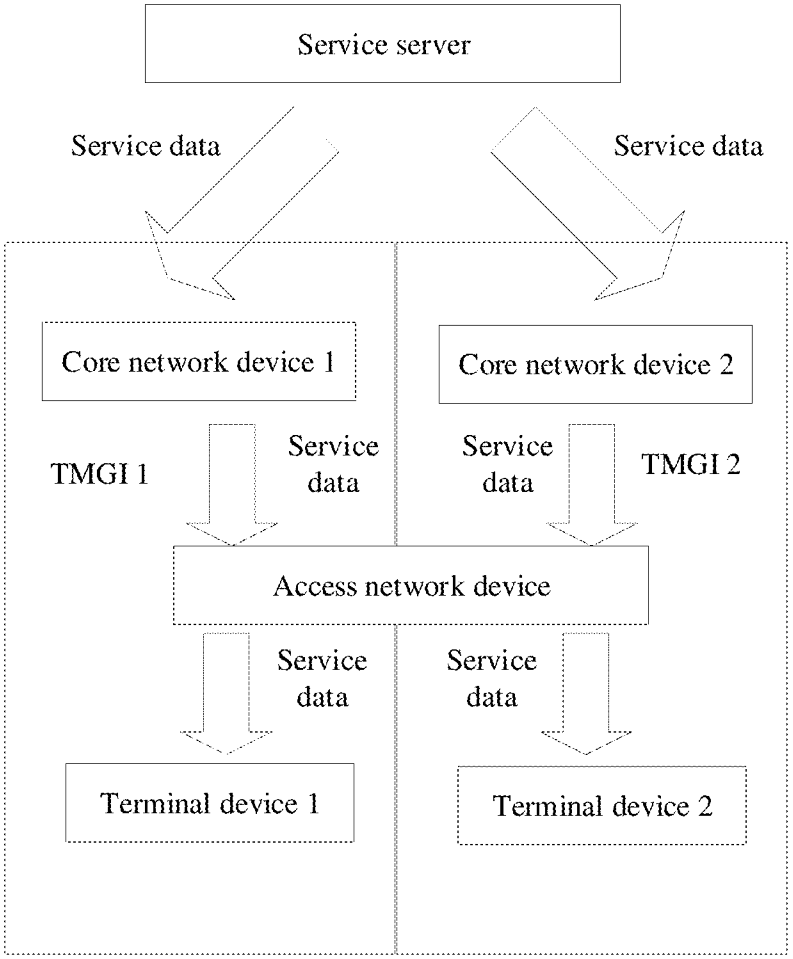
FIG. 4 is a schematic diagram of service data transmission according to an embodiment.

Further, with reference to the foregoing descriptions, in a RAN sharing scenario, when a same service server transmits data of a multicast service by using different operators, core networks (CNs) corresponding to the different operators independently allocate TMGIs, that is, for a same multicast service, corresponding multicast service session identifiers in the CNs of the different operators are not associated, and may be the same or different. As shown in FIG. 4, an access network device is shared by a PLMN 1 of an operator 1 and a PLMN 2 of an operator 2. When a same service server sends or transmits data of a multicast service by using both a network of the operator 1 and a network of the operator 2, a core network device 1 of the operator 1 allocates a TMGI 1 to the multicast service, and a core network device 2 of the operator 2 allocates a TMGI 2 to the multicast service.

For a same multicast service, in the PLMN 1, the access network device needs to establish a transmission channel and a radio bearer for a multicast service session corresponding to the multicast service, to transmit data of the multicast service to a terminal device in the PLMN 1. Similarly, in the PLMN 2, the access network device also needs to establish a transmission channel and a radio bearer for the multicast service session corresponding to the multicast service, to transmit the data of the multicast service to a terminal device in the PLMN 2.

In the RAN sharing scenario, the access network device cannot identify whether the service corresponding to the TMGI 1 and the service corresponding to the TMGI 2 are a same service. The access network device respectively allocates different resources to the multicast service in the two networks. The access network device sends the service data of the multicast service by using the resource allocated in the PLMN 1 and sends the service data of the multicast service by using the resource allocated in the PLMN 2. Consequently, NG resources and air interface resources are wasted, and transmission efficiency is affected.

Therefore, this embodiment provides a method. An access network device shared by a plurality of operators may identify whether multicast services transmitted in different core networks are a same service, and same NG resources and air interface resources are shared for same multicast services in the different core networks, to save transmission resources, improve resource utilization, and improve transmission efficiency.

A network architecture and a service scenario are intended to describe the embodiments more clearly, and do not constitute a limitation on the embodiments. A person of ordinary skill in the art may know that with evolution of the network architecture and emergence of a new service scenario, the embodiments are also applicable to similar problems.

In this embodiment, interaction between a core network device, an access network device, and a terminal device is used as an example for description. An operation performed by the core network device may alternatively be performed by a chip or a module in the core network device, an operation performed by the access network device may alternatively be performed by a chip or a module in the access network device, and an operation performed by the terminal device may alternatively be performed by a chip or a module in the terminal device.

It may be understood that various numbers in the embodiments are merely used for differentiation for ease of description and are not used to limit the scope of embodiments. The sequence numbers of the foregoing processes do not mean execution sequences, and the execution sequences of the processes should be determined based on functions and internal logic of the processes.

In the embodiments, the access network device is an access network device shared by a first core network device and a second core network device. The first core network device is a core network device in a first core network, and the first core network may belong to a first PLMN of a first operator. The second core network device is a core network device in a second core network, and the second core network may belong to a second PLMN of a second operator. A network in which the first core network is located may also be referred to as a first network, and a network in which the second core network is located may also be referred to as a second network.

In addition, the first operator and the second operator may share a same core network device. That is, the first core network device and the second core network device may be a same core network device, and the core network device may serve both the first PLMN of the first operator and the second PLMN of the second operator.

Figure 5:
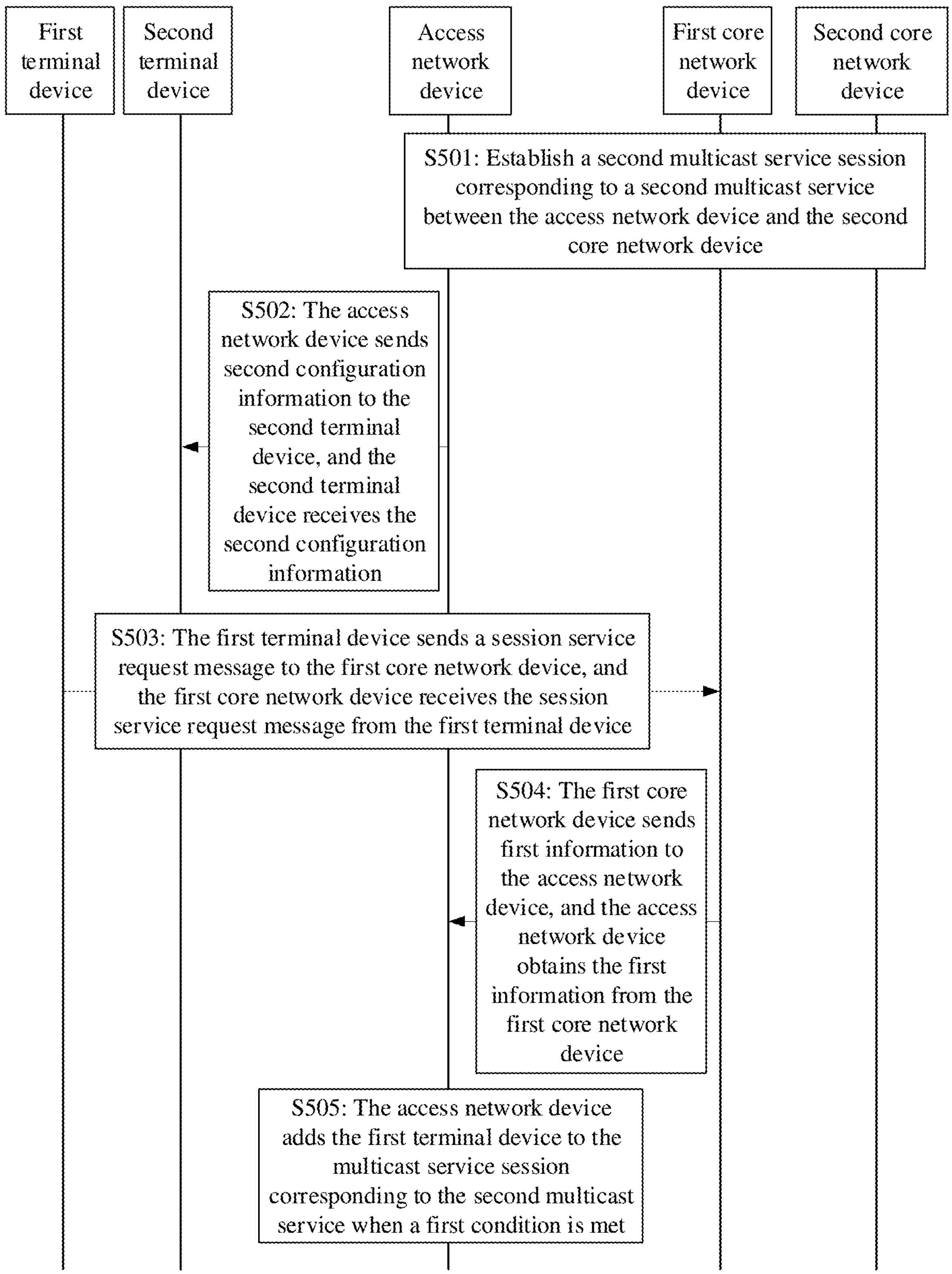
FIG. 5 is a schematic flowchart of a communication method according to an embodiment.

FIG. 5 is a schematic flowchart of a communication method according to an embodiment. The method includes the following steps.

S501: Establish a second multicast service session corresponding to a second multicast service between an access network device and a second core network device.

A process of establishing the second multicast service session is not limited in this embodiment. Details are not described herein.

In the process of establishing the second multicast service session, a second data transmission channel used to transmit service data of the second multicast service between the access network device and the second core network device is established, and a second multicast radio bearer (MRB) used to transmit the service data of the second multicast service between the access network device and a terminal device is established.

The data transmission channel may be a general packet radio service (GPRS) tunnelling protocol user plane (GTP-U) tunnel or an IP multicast group tunnel.

Step S501 is optional.

S502: The access network device sends second configuration information to a second terminal device, and the second terminal device receives the second configuration information.

The second terminal device belongs to the second core network device, that is, the second terminal device accesses the second core network device through a radio access network. The second configuration information may be sent by using one or more RRC messages.

The second configuration information may include configuration information of an MRB corresponding to the second multicast service. The multicast radio bearer may be an enhanced data radio bearer (DRB) or may be a newly defined MRB. Multicast includes two data transmission manners: a point-to-multipoint manner and a point-to-point manner. In the point-to-multipoint manner, a corresponding user identifier is a G-RNTI. In the point-to-point manner, a corresponding user identifier is a C-RNTI. In the point-to-point manner, the second configuration information may not include a C-RNTI corresponding to the MRB.

When the access network device configures a split MRB that includes a point-to-multipoint RLC entity and a point-to-point RLC entity for the second terminal device, the second configuration information may include a second user identifier (for example, a second G-RNTI), a second multicast service identifier, a second multicast service session identifier, an MRB identity (or an MRB flag), a PDCP configuration, an RLC configuration, a logical channel identity, a security configuration, and the like. Optionally, a second C-RNTI may be further included, and the second C-RNTI is used to scramble scheduling information of the service data in the point-to-point manner.

The second user identifier is used to scramble first scheduling information, and the first scheduling information is used to schedule the service data of the second multicast service. For example, the second user identifier may be the second G-RNTI, and the first scheduling information may be downlink control information (DCI).

If the access network device configures an MRB that includes a point-to-multipoint RLC entity for the second terminal device, the second configuration information may include a second user identifier, a second multicast service identifier of the second multicast service, a second multicast service session identifier of the second multicast service session, an MRB identity (or an MRB flag), a PDCP configuration, an RLC configuration, a logical channel identity, a security configuration, and the like.

If the access network device configures an MRB that includes a point-to-point RLC entity for the second terminal device, the second configuration information may include a second multicast service identifier, a second multicast service session identifier, an MRB identity (or an MRB flag), a PDCP configuration, an RLC configuration, a logical channel identity, a security configuration, and the like. Optionally, a second user identifier may be further included, and the second user identifier may be a second C-RNTI.

In a possible implementation, the second configuration information may include two parts: a radio bearer configuration information element and an RLC bearer configuration information element.

The radio bearer configuration information element may include the MRB identity (or the MRB flag), the PDCP configuration, and the security configuration, or include a DRB identity, the PDCP configuration, and the security configuration. The RLC bearer configuration information element may include the RLC configuration and the second user identifier. The second multicast service identifier and the second multicast service session identifier may be located in the radio bearer configuration information element or may be located in the RLC bearer configuration information element.

For example, the radio bearer configuration information element may be shown as follows:

```
-- ASN1START
-- TAG-RADIOBEARERCONFIG-START
RadioBearerConfig ::=                SEQUENCE {
  srb-ToAddModList                   SRB-ToAddModList          OPTIONAL,
-- Cond HO-Conn
  srb3-ToRelease          ENUMERATED{true}          OPTIONAL,   -- Need N
  drb-ToAddModList          DRB-ToAddModList          OPTIONAL,   -- Cond
HO-toNR
  drb-ToReleaseList       DRB-ToReleaseList         OPTIONAL,   -- Need N
  securityConfig          SecurityConfig            OPTIONAL,   -- Need M
Implementation 1: mrb-ToAddModList (MRB addition or modification list);
        mrb-ToReleaseList (MRB release list);
  ...
```

-continued

```
  }
  SRB-ToAddModList ::=              SEQUENCE (SIZE (1..2)) OF SRB-ToAddMod
  SRB-ToAddMod ::=                     SEQUENCE {
    srb-Identity                     SRB-Identity,
    reestablishPDCP          ENUMERATED{true}              OPTIONAL,   -- Need N
    discardOnPDCP            ENUMERATED{true}              OPTIONAL,   -- Need N
    pdcp-Config                       PDCP-Config                  OPTIONAL,   -- Cond
PDCP
    ...
  }
  DRB-ToAddModList ::=      SEQUENCE (SIZE (1..maxDRB)) OF DRB-ToAddMod
  DRB-ToAddMod ::=                  SEQUENCE {
    cnAssociation                     CHOICE {
      eps-BearerIdentity              INTEGER (0..15),
      sdap-Config                      SDAP-Config
    }                                        OPTIONAL,    -- Cond DRBSetup
    drb-Identity                           DRB-Identity,
    reestablishPDCP          ENUMERATED{true}              OPTIONAL,   -- Need N
    recoverPDCP              ENUMERATED{true}              OPTIONAL,   -- Need N
    pdcp-Config                       PDCP-Config                       OPTIONAL,
-- Cond PDCP
    ...,
    [[
    daps-Config-r16                ENUMERATED{true}                 OPTIONAL,   -
- Cond DAPS
    ]]
  Implementation 2: mrb-Flag;
  }
  DRB-ToReleaseList ::=          SEQUENCE (SIZE (1..maxDRB)) OF DRB-Identity
  SecurityConfig ::=              SEQUENCE {
    securityAlgorithmConfig              SecurityAlgorithmConfig        OPTIONAL,   -
- CondRBTermChange1
    keyToUse                         ENUMERATED{master, secondary} OPTIONAL,
-- Cond RBTermChange
    ...
  }
  -- TAG-RADIOBEARERCONFIG-STOP
  -- ASN1STOP
```

Herein, DRB-ToReleaseList includes the DRB identity, and SecurityConfig represents the security configuration.

If the access network device configures the RLC configuration of the MRB for the second terminal device, the RLC bearer configuration information element may be shown as follows:

```
  -- ASN1START
  -- TAG-RLC-BEARERCONFIG-START
  RLC-BearerConfig ::=                SEQUENCE {
    logicalChannelIdentity            LogicalChannelIdentity,
    servedRadioBearer                   CHOICE {
      srb-Identity                        SRB-Identity,
      drb-Identity                          DRB-Identity
  Implementation 1: mrb-Identity                  MRB-Identity
    }
OPTIONAL,    -- Cond LCH-SetupOnly
    reestablishRLC                  ENUMERATED {true}        OPTIONAL,   --
Need N
    rlc-Config                                                   RLC-Config
OPTIONAL,    -- Cond LCH-Setup
    mac-LogicalChannelConfig          LogicalChannelConfig         OPTIONAL,
-- Cond LCH-Setup
    ...,
    [[
    rlc-Config-v1610                RLC-Config-v1610    OPTIONAL    -- Need R
    ]]
  Implementation 1 and implementation 2: g-RNTI  OPTIONAL
  }
  -- TAG-RLC-BEARERCONFIG-STOP
  -- ASN1STOP
```

Herein, RLC-BearerConfig includes an RLC bearer configuration.

In this embodiment, when the MRB is configured for the second terminal device, corresponding configuration information may be obtained by modifying the radio bearer configuration information element and the RLC bearer configuration information element. In an implementation 1, MRB information is separately added to the radio bearer configuration information element in the foregoing example, that is, an MRB addition or modification list (mrb-ToAddModList) and an MRB release list (mrb-ToReleaseList) are added. The MRB addition or modification list is used to add or modify an MRB, and the MRB release list is used to release an MRB. The MRB addition or modification list and the MRB release list include an MRB identity (mrb-Identity).

In addition, mrb-Identity is added to the RLC bearer configuration information element, where mrb-Identity indicates an identifier of the MRB to be added or modified. Optionally, if the access network device configures the MRB that includes the point-to-multipoint RLC entity for the second terminal device, a G-RNTI may be further added to the RLC bearer configuration information element. The G-RNTI indicates the second user identifier.

In an implementation 2, mrb-Flag is added to DRB-ToAddModList in the radio bearer configuration information element, where mrb-Flag indicates that a DRB corresponding to the radio bearer configuration information element is used as an MRB. Optionally, if the access network device configures the MRB that includes the point-to-multipoint RLC entity for the second terminal device, a G-RNTI is added to the RLC bearer configuration information element. The G-RNTI indicates the second user identifier.

For example, when the access network device configures the split) MRB that includes the point-to-multipoint RLC entity and the point-to-point RLC entity for the second terminal device, an implementation 1 may be as follows: The second configuration information may include a first MRB identity and MRB-related PDCP configuration information included in the MRB addition or modification list in the radio bearer configuration information element. A first RLC bearer configuration information element includes the first MRB identity, MRB-related point-to-multipoint RLC configuration information, and the second user identifier, that is, a G-RNTI. A second RLC bearer configuration information element includes the first MRB identity and MRB-related point-to-point RLC configuration information. The first MRB identity is used to associate the radio bearer configuration information element with the RLC bearer configuration information element. An implementation 2 may be as follows: The second configuration information may include mrb-Flag, a first DRB identity, and PDCP configuration information included in DRB-ToAddModList in the radio bearer configuration information element. A first RLC bearer configuration information element includes the first DRB identity, MRB-related point-to-multipoint RLC configuration information, and the second user identifier, that is, a G-RNTI. A second RLC bearer configuration information element includes the first DRB identity and MRB-related point-to-point RLC configuration information. The first DRB identity is used to associate the radio bearer configuration information element with the RLC bearer configuration information element.

The second configuration information may include the second user identifier (for example, the second G-RNTI), the second multicast service identifier, the second multicast service session identifier, the MRB identity (or the MRB flag), the PDCP configuration, the RLC configuration, the logical channel identity, the security configuration, and the like. Optionally, the second C-RNTI may be further included. Based on this method, the access network device may establish, for the terminal device, a radio bearer used for a multicast service, and may configure a plurality of RLC entities.

Step S502 is optional.

S503: A first terminal device sends a session service request message to a first core network device, and the first core network device receives the session service request message from the first terminal device.

The first terminal device belongs to the first core network device, that is, the first terminal device accesses a radio access network corresponding to the first core network device. The first core network device may be an AMF.

The session service request message may include a first multicast service session identifier, and the session service request message is used to request to obtain service data of a first multicast service. The terminal device may obtain the first multicast service session identifier by using a broadcast message from the access network device.

The first multicast service session identifier is a session identifier corresponding to the first multicast service in the first core network device, and the first multicast service session identifier is allocated by a core network side to which the first core network device belongs. For example, in a 5G system, an SMF may allocate the first multicast service session identifier to the first multicast service. For example, the first multicast service session identifier may be a first IP multicast group address or a first TMGI.

In this embodiment, in a network to which the first core network device belongs, before the first terminal device sends the session service request message, the access network device does not allocate an NG resource or an air interface resource to the first multicast service. That is, the access network device does not establish, with the core network side, a data transmission channel used to transmit the service data of the first multicast service and does not establish an MRB corresponding to the first multicast service.

In addition, the session service request message may be a NAS message and is sent by the first terminal device to the first core network device through the access network device. In the network to which the first core network device belongs, the first multicast service further corresponds to one first multicast service identifier, and there is a mapping relationship between the first multicast service identifier and the first multicast service session identifier.

Step S503 is optional.

S504: The first core network device sends first information to the access network device, and the access network device obtains the first information from the first core network device.

The first information is used to request to add the first terminal device to a multicast service session corresponding to the first multicast service.

For ease of description, the multicast service session corresponding to the first multicast service may be briefly referred to as the first multicast service session below, and the multicast service session corresponding to the second multicast service may be briefly referred to as the second multicast service session below.

The first information may be carried in a PDU session modification request message. The first information may include a first identifier corresponding to the first multicast service, first QoS flow information of the first multicast service, the first multicast service session identifier, and the first multicast service identifier.

In this embodiment, there may be a plurality of implementations for the first identifier. For example, in an implementation 1, the first identifier may be the first multicast service identifier corresponding to the first multicast service in the first core network device.

In an implementation 2, the first identifier may be the first multicast service session identifier corresponding to the first multicast service in the first core network device.

In the implementation 2, when the first multicast service session identifier is the first IP multicast group address, the first identifier may be the first IP multicast group address; or when the first multicast service session identifier is the first TMGI, the first identifier may be the first TMGI, or the first identifier may be a first service identifier in the first TMGI.

In an implementation 3, the first identifier may be an identifier corresponding to the first multicast service in a service server or may be an identifier allocated by a service server. The service server may allocate an identifier to each multicast service, so that the identifier allocated by the service server may be used as the first identifier.

S505: The access network device adds the first terminal device to the multicast service session corresponding to the second multicast service when a first condition is met.

The first condition includes that the first multicast service and the second multicast service are a same multicast service, and the second multicast service is a multicast service provided by the second core network device.

How the access network device determines whether the first multicast service and the second multicast service are the same multicast service is not limited in this embodiment. In an implementation, if the first identifier corresponding to the first multicast service matches a second identifier corresponding to the second multicast service, the first multicast service and the second multicast service are the same multicast service.

That the first identifier matches a second identifier may mean that the first identifier is the same as the second identifier or may mean that there is a mapping relationship between the first identifier and the second identifier.

The following separately describes how the access network device determines, based on the first identifier and the second identifier, whether the first multicast service is the same as the second multicast service.

In a first possible implementation, the first identifier is the first multicast service identifier corresponding to the first multicast service in the first core network device, and the second identifier is the second multicast service identifier corresponding to the second multicast service in the second core network device.

In this implementation, there may be the following cases: Case 1: It is agreed in advance that a same multicast service identifier is allocated to a same multicast service in different PLMNs (or different networks). Case 2: A mapping relationship between a multicast service and a multicast service identifier may be established in advance.

In the case 1, a multicast service may correspond to different multicast service identifiers in different PLMNs. Therefore, in this embodiment, for the same multicast service, it may be agreed in advance that the same multicast service identifier is configured in the different PLMNs. In this way, the access network device can uniquely determine, in the different PLMNs, the multicast service corresponding to the multicast service identifier.

The first core network device and the second core network device may separately identify, based on related information about a multicast service, a multicast service that exists in both a first PLMN in which the first core network device is located and a second PLMN in which the second core network device is located. The multicast service that exists in both the first PLMN and the second PLMN corresponds to a same multicast service identifier. The related information about the multicast service may include but is not limited to information provided by the service server, port information of the multicast service, and the like.

For example, the multicast service identifier of the multicast service that exists in both the first PLMN and the second PLMN may be shown in Table 1.

TABLE 1

| | Multicast service identifier | PLMN in which the multicast service exists |
|---|---|---|
| Multicast service 1 | Identifier 1 | First PLMN and second PLMN |
| Multicast service 2 | Identifier 2 | First PLMN and second PLMN |
| Multicast service 3 | Identifier 3 | First PLMN |

In Table 1, if the multicast service 1 exists in the first PLMN and the second PLMN, a multicast service identifier of the multicast service 1 in each of the first PLMN and the second PLMN is the identifier 1. Other cases are deduced by analogy. Details are not described.

When obtaining the first multicast service identifier (that is, the first identifier), the access network device determines that the second multicast service identifier corresponding to the second multicast service provided by the second core network device is the same as the first multicast service identifier, and therefore may determine that the first multicast service and the second multicast service are the same multicast service.

Optionally, an identifier allocation range may be preconfigured. The identifier allocation range includes a plurality of identifiers, and a multicast service identifier of a multicast service that exists in a plurality of PLMNs may be within the identifier allocation range. For example, the identifier allocation range may be from 000010 to 0000FF.

Optionally, when obtaining the first multicast service identifier (that is, the first identifier), the access network device may first determine whether the first identifier is within the identifier allocation range, and if the first identifier is within the identifier allocation range, determine whether the first identifier matches the second identifier. If the first identifier is not within the identifier allocation range, it may be determined that there is no identifier matching the first identifier.

In the case 2, the access network device may establish a first mapping relationship in advance. The first mapping relationship includes a mapping relationship between a multicast service and multicast service identifiers in PLMNs of different operators. Alternatively, the first core network device or the second core network device may establish a first mapping relationship, and then send the first mapping relationship to the access network device.

When the access network device establishes the first mapping relationship, the access network device may identify multicast service identifiers of each multicast service in different PLMNs based on related information about the multicast service, and then store the multicast service identifiers of the multicast service in the different PLMNs, to obtain the first mapping relationship.

For example, a multicast service identifier of a multicast service that exists in a plurality of PLMNs may be shown in Table 2. In Table 2, one multicast service may have a plurality of multicast service identifiers in one PLMN.

TABLE 2

| | Multicast service identifier in a PLMN 1 | Multicast service identifier in a PLMN 2 | Multicast service identifier in a PLMN 3 |
|---|---|---|---|
| Multicast service 1 | Identifier 1-1 and identifier 1-2 | Identifier 1-3 | Identifier 1-4 |
| Multicast service 2 | Identifier 2-1 and identifier 2-2 | None | Identifier 2-3 |
| Multicast service 3 | Identifier 3-1 | None | None |

Based on the first mapping relationship, the access network device may determine multicast service identifiers respectively corresponding to each multicast service in different PLMNs.

When obtaining the first multicast service identifier (that is, the first identifier), the access network device may determine the first multicast service corresponding to the first identifier based on the first mapping relationship and determine the second multicast service corresponding to the second identifier based on the first mapping relationship. If the first multicast service and the second multicast service are the same multicast service, it may be determined that the first identifier matches the second identifier. If the first multicast service and the second multicast service are different multicast services, it may be determined that the first identifier does not match the second identifier.

For example, with reference to Table 2, the first identifier obtained by the access network device from the first core network device in the PLMN 1 is the identifier 1-1, and the second identifier obtained from the second core network device in the PLMN 2 is the identifier 1-3. Based on the first mapping relationship shown in Table 2, the access network device may determine that the first identifier corresponds to the multicast service 1 in the PLMN 1, and determine that the second identifier also corresponds to the multicast service 1 in the PLMN 2, and therefore may determine that the first identifier and the second identifier correspond to a same multicast service, that is, the first identifier matches the second identifier.

For another example, with reference to Table 2, the first identifier obtained by the access network device from the first core network device in the PLMN 1 is the identifier 2-1, and the second identifier obtained from the second core network device in the PLMN 2 is the identifier 1-3. Based on the first mapping relationship shown in Table 2, the access network device may determine that the first identifier corresponds to the multicast service 2 in the PLMN 1, and determine that the second identifier corresponds to the multicast service 1 in the PLMN 2, and therefore may determine that the first identifier and the second identifier correspond to different multicast services, that is, the first identifier does not match the second identifier.

Optionally, when obtaining the first identifier, the access network device may first determine whether the first mapping relationship includes the first identifier, and if determining that the first identifier is in the first mapping relationship, determine, based on the first mapping relationship, whether the first identifier matches the second identifier.

If determining that the first identifier is not in the first mapping relationship, the access network device may consider that no session is established in any PLMN for the first multicast service corresponding to the first identifier. According to this method, session establishment efficiency may be improved.

In a second possible implementation, the first identifier is the first multicast service session identifier corresponding to the first multicast service in the first core network device, and the second identifier is the second multicast service session identifier corresponding to the second multicast service in the second core network device.

Similar to the first possible implementation, in this implementation, there may be the following cases: Case 1: It is agreed in advance that a same multicast service session identifier is allocated to a same multicast service in different PLMNs (or different networks). Case 2: A mapping relationship between a multicast service and a multicast service session identifier may be established in advance.

In the case 1, for the same multicast service, it may be agreed in advance that the same multicast service session identifier is configured in the different PLMNs. In this way, the access network device can uniquely determine, in the different PLMNs, the multicast service corresponding to the multicast service session identifier.

The first core network device and the second core network device may separately identify, based on related information about a multicast service, a multicast service that exists in both a first PLMN in which the first core network device is located and a second PLMN in which the second core network device is located. The multicast service that exists in both the first PLMN and the second PLMN corresponds to a same multicast service session identifier.

When obtaining the first multicast service session identifier, the access network device determines that the second multicast service session identifier corresponding to the second multicast service provided by the second core network device is the same as the first multicast service session identifier, and therefore may determine that the first multicast service and the second multicast service are the same multicast service.

Optionally, an identifier allocation range may be preconfigured. The identifier allocation range includes a plurality of identifiers, and a multicast service session identifier of a multicast service that exists in a plurality of PLMNs may be within the identifier allocation range. For example, the identifier allocation range may be from 000010 to 0000FF.

Optionally, when obtaining the first multicast service session identifier (that is, the first identifier), the access network device may first determine whether the first identifier is within the identifier allocation range, and if the first identifier is within the identifier allocation range, determine whether the first identifier matches the second identifier. If the first identifier is not within the identifier allocation range, it may be determined that there is no identifier matching the first identifier.

In the case 2, the access network device may establish a second mapping relationship in advance. The second mapping relationship includes a mapping relationship between a multicast service and multicast service session identifiers in PLMNs of different operators. Alternatively, the first core network device or the second core network device may establish a second mapping relationship, and then send the second mapping relationship to the access network device.

When the access network device establishes the second mapping relationship, the access network device may identify multicast service session identifiers of each multicast service in different PLMNs based on related information about the multicast service, and then store the multicast service session identifiers of the multicast service in the different PLMNs, to obtain the second mapping relationship.

When obtaining the first multicast service session identifier (that is, the first identifier), the access network device may determine the first multicast service corresponding to the first identifier based on the second mapping relationship and determine the second multicast service corresponding to the second identifier based on the second mapping relationship. If the first multicast service and the second multicast service are the same multicast service, it may be determined that the first identifier matches the second identifier. If the first multicast service and the second multicast service are different multicast services, it may be determined that the first identifier does not match the second identifier.

Optionally, when obtaining the first identifier, the access network device may first determine whether the second mapping relationship includes the first identifier, and if determining that the first identifier is in the second mapping relationship, determine, based on the second mapping relationship, whether the first identifier matches the second identifier.

If determining that the first identifier is not in the second mapping relationship, the access network device may consider that no session is established in any PLMN for the first multicast service corresponding to the first identifier. According to this method, session establishment efficiency may be improved.

Similarly, when the first identifier is the service identifier, the TMGI, or the IP multicast group address, the foregoing method may also be used. Details are not described herein.

In a third possible implementation, the first identifier may be a first public identifier allocated by the service server, and the second identifier may be a second public identifier allocated by the service server. For ease of description, in the third possible implementation, the first identifier is referred to as the first public identifier, and the second identifier is referred to as the second public identifier.

The service server may allocate a same public identifier to a same multicast service in different PLMNs, that is, in the different PLMNs, public identifiers of the same multicast service are the same.

In this embodiment, the public identifier may exist independently, that is, the public identifier may be carried in an independent field. The public identifier may alternatively be located in a multicast service session identifier or a multicast service identifier, that is, the public identifier may be a part of the multicast service session identifier or the multicast service identifier. For example, when the public identifier is a part of a TMGI, the TMGI may include a PLMN identifier, a service identifier, and a public identifier.

In the third possible implementation, information sent by the first core network device to the access network device in a process of establishing the first session includes an identifier of a first PLMN, the first multicast service session identifier, and the first public identifier, and information sent by the second core network device to the access network device in the process of establishing the second session includes an identifier of a second PLMN, the second multicast service session identifier, and the second public identifier.

If determining that the first public identifier is the same as the second public identifier, the access network device may determine that the first identifier matches the second identifier, that is, determine that the second session and the first session correspond to a same multicast service. If determining that the first public identifier is different from the second public identifier, the access network device may determine that the first identifier does not match the second identifier, that is, determine that the second session and the first session correspond to different multicast services. With reference to the foregoing descriptions, when determining that the first multicast service and the second multicast service are the same multicast service, the access network device may add the first terminal device to the multicast service session corresponding to the second multicast service. Further, because the first multicast service and the second multicast service are the same multicast service, and the service data of the second multicast service may be used as the service data of the first multicast service, the access network device may no longer obtain the service data of the first multicast service from the network in which the first core network device is located. Correspondingly, the network in which the first core network device is located may no longer send the service data of the first multicast service to the access network device.

In this embodiment, because the access network device may not obtain the service data of the first multicast service, the access network device may obtain the service data of the first multicast service through the second data transmission channel between the access network device and a core network side on which the second core network device is located.

A first data transmission channel used to transmit the service data of the first multicast service may be established between the access network device and the core network side on which the first core network device is located, or a first data transmission channel may not be established. The data transmission channel may be a GTP-U tunnel or an IP multicast group tunnel.

In a possible implementation, when the first data transmission channel is not established, the access network device may send second information to the first core network device. The second information indicates not to establish the first data transmission channel with the first core network device.

In another possible implementation, the access network device may send a channel establishment message to the first core network device. The channel establishment message indicates to establish the first data transmission channel and indicates the first core network device to suspend transmission of the service data of the first multicast service or indicates the first core network device to suspend transmission of the service data of the first multicast service.

In another possible implementation, after the first data transmission channel is established, the access network device may further send third information to the first core network device. The third information indicates that the first data transmission channel is in an inactive state, the third information indicates to suspend transmission of the service data of the first multicast service through the first data transmission channel, or the third information may indicate the first core network device to suspend transmission of the service data of the first multicast service. A process of establishing the first data transmission channel is not limited. Details are not described herein.

Similarly, between the access network device and the first terminal device, the access network device may no longer allocate an air interface resource used to transmit the service data of the first multicast service. In the network in which the first core network device is located, the access network device may no longer configure a first MRB for the first multicast service. The first MRB is used to transmit the service data of the first multicast service between the access network device and the first terminal device.

The access network device may reuse the second MRB and transmit the service data of the first multicast service to the first terminal device by using the second MRB. The second MRB is configured to carry the service data of the second multicast service over an air interface. In other words, the second MRB is not only used to transmit the service data of the second multicast service to the second terminal device, but also used to transmit the service data of the second multicast service (that is, the first multicast service) to the first terminal device.

If the access network device reuses the second MRB to transmit the service data of the first multicast service to the first terminal device, the access network device may send first configuration information to the first terminal device.

In a possible implementation, content included in the first configuration information may be completely the same as content included in the second configuration information, that is, the first configuration information includes the configuration information of the second MRB.

In another possible implementation, content included in the first configuration information may be partially the same as content included in the second configuration information, that is, the first configuration information includes a part of the configuration information of the second MRB.

For example, the first configuration information includes a first user identifier, and the first user identifier is the same as the second user identifier included in the second configuration information, that is, the first configuration information includes the second user identifier.

For another example, a security configuration included in the first configuration information is the same as the security configuration included in the second configuration information, and the security configuration includes a security algorithm and a key. For another example, an MRB identity, a PDCP configuration, and an RLC configuration included in the first configuration information are the same as the MRB identity, the PDCP configuration, and the RLC configuration included in the second configuration information.

For another example, a radio bearer configuration information element included in the first configuration information is the same as the radio bearer configuration information element included in the second configuration message.

For another example, an RLC bearer configuration information element included in the first configuration information is the same as the RLC bearer configuration information element included in the second configuration message.

For another example, an RLC bearer configuration information element that is used for point-to-multipoint transmission and that is included in the first configuration information is the same as the RLC bearer configuration information element that is used for point-to-multipoint transmission and that is included in the second configuration message.

The first user identifier is used to scramble the first scheduling information, and the first scheduling information is used to schedule the service data of the second multicast service. The first user identifier may be a first G-RNTI. Because the first multicast service is the same as the second multicast service, the first scheduling information herein may also be considered as being used to schedule the service data of the first multicast service.

When the access network device configures, for the first terminal device, an RLC entity used for the point-to-point transmission manner, the first configuration information that may be sent by the access network device to the first terminal device may not include the first G-RNTI. In this case, the first configuration information may include a first C-RNTI. The first C-RNTI may alternatively be obtained in another manner. This is not limited in this embodiment. The first C-RNTI is used to scramble scheduling information of the service data of the second multicast service when the service data is transmitted in the point-to-point manner.

When the access network device configures, for the first terminal device, an MRB that includes the RLC entity used for the point-to-point transmission manner, in the first configuration information sent by the access network device, other information may be the same as information in the second configuration information except that an RLC bearer configuration is different from the RLC bearer configuration in the second configuration information. That is, at least one of a second multicast service identifier, a second multicast service session identifier, the PDCP configuration, and the security configuration in the first configuration information may be the same as corresponding information in the second configuration information.

Figure 6:
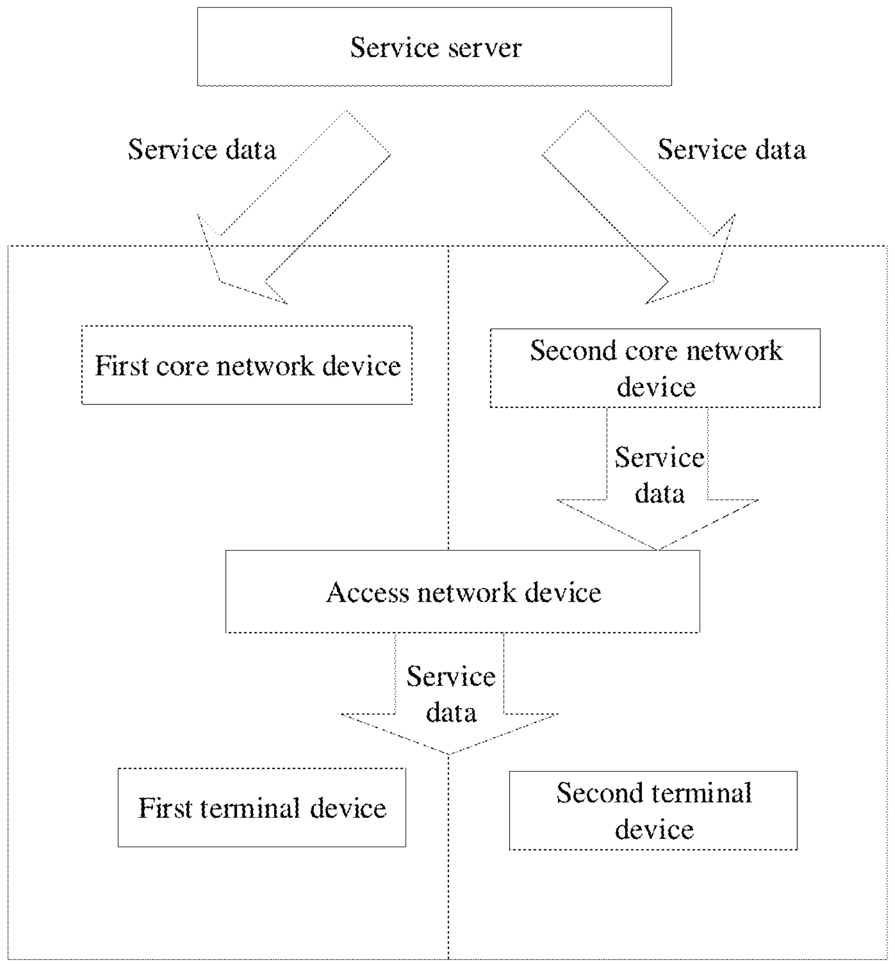
FIG. 6 is a schematic diagram of service data transmission according to an embodiment.

With reference to the foregoing descriptions, FIG. 6 is a schematic diagram of service data transmission according to an embodiment. After the access network device adds the first terminal device to the multicast service session corresponding to the second multicast service, although the service server may transmit the service data of the second multicast service (in this case, the second multicast service is the first multicast service) to the first core network device and the second core network device, the first core network device no longer transmits the service data of the first multicast service to the access network device. When receiving the service data of the second multicast service from the second core network device, the access network device may transmit the service data to the first terminal device and the second terminal device in a multicast manner. Although the first terminal device and the second terminal device do not belong to a same network, or do not belong to a same core network device, the access network device needs to transmit the service data only once in the two networks. This can save NG resources and air interface resources, improve data transmission efficiency, and reduce resource overheads.

In addition, when the access network device transmits the service data to the first terminal device, the first terminal device may monitor a physical downlink control channel (PDCCH), descramble a cyclic redundancy code (CRC) of the PDCCH by using the first user identifier (the first G-RNTI or the first C-RNTI), and receive the service data after the descrambling succeeds. A process is not described.

When the access network device determines that the first multicast service and the second multicast service are the same multicast service, the access network device may simultaneously provide the service data of the second multicast service for the terminal devices in the two networks by using an established resource related to the second multicast service. In this way, same NG resources and air interface resources are shared for same multicast services from the two core networks, to save resources and improve data transmission efficiency.

Further, in this embodiment, if the network in which the second core network device is located stops transmitting the service data of the second multicast service, the access network device may receive first release information from the second core network device. The first release information indicates to release the second data transmission channel. Optionally, the first release information may further indicate to release the second MRB.

In a possible implementation, if the first data transmission channel is not established between the access network device and the core network in which the first core network device is located, the access network device may send fifth information to the first core network device. The fifth information is used to trigger establishment of the first data transmission channel.

In a possible implementation, if the first data transmission channel is established between the access network device and the core network in which the first core network device is located, the access network device may send sixth information to the first core network device. The sixth information is used to activate the first data transmission channel, or the sixth information indicates to transmit the service data of the first multicast service through the first data transmission channel.

The first release information may include a release cause, and the release cause may include any one of the following causes:

Cause 1: No service data of the second multicast service arrives on the core network side within specified duration.

Cause 2: The service server stops transmitting the service data of the second multicast service.

Cause 3: A request is made to convert the second multicast service from transmission in a multicast manner to transmission in a unicast manner.

Cause 4: A request is made to convert the second multicast service into a unicast service.

Cause 5: There is no terminal device that receives the service data of the second multicast service in the network corresponding to the second core network device.

Cause 6: A quantity of terminal devices that receive the service data of the second multicast service in the network corresponding to the second core network device is less than or equal to a threshold.

If the release cause is the cause 1 or the cause 2, the access network device may determine that neither the service data of the second multicast service nor the service data of the first multicast service can be obtained, and the access network device may indicate the terminal device to release the second MRB.

There may be a plurality of implementations for releasing the second MRB. In an implementation, a configuration message sent by the access network device to the terminal device includes mrb-ToReleaseList, and mrb-ToReleaseList includes an MRB identity.

In another implementation, a configuration message sent by the access network device to the terminal device includes drb-ToReleaseList, and drb-ToReleaseList includes a DRB identity associated with the MRB.

If the release cause is the cause 3, the cause 4, the cause 5, or the cause 6, the access network device may determine that the service data of the first multicast service needs to be obtained by using the network in which the first core network device is located, and therefore send the fifth information or the sixth information.

Further, if the access network device determines that the service data of the first multicast service needs to be obtained by using the network in which the first core network device is located, the access network device may further establish the first MRB corresponding to the first multicast service based on the first QoS flow information, or the access network device may further update the second MRB based on the first QoS flow information. An updated second MRB is used to transmit the service data of the first multicast service to the first terminal device. For ease of description, the updated second MRB may be referred to as the first MRB.

A process of establishing the first MRB based on the first QoS flow information is not limited in this embodiment. Details are not described herein. When the second MRB is updated, the security configuration corresponding to the second MRB may be updated, and other information about the second MRB may not be updated. For example, the MRB identity, the PDCP configuration, the second user identifier, and the RLC configuration of the second MRB may not be updated.

In an implementation, the access network device may send third configuration information to the first terminal device. The third configuration information includes configuration information of the first MRB, for example, may include at least one of the following information corresponding to the first MRB: a third user identifier, an MRB identity, a PDCP configuration, an RLC configuration, a security configuration, and the like. The third user identifier is used to scramble second scheduling information, and the second scheduling information is used to schedule service data that is of the first multicast service and that is transmitted in the first MRB.

In a possible implementation, the third configuration information sent by the access network device to the first terminal device includes updated securityConfig. This implementation is used to update the security configuration of the MRB.

In another possible implementation, an RLC bearer configuration information element in the third configuration information sent by the access network device to the first terminal device includes an updated third user identifier, that is, a G-RNTI. This implementation is used to update the third user identifier.

In addition, if the access network device uses a CU-DU separated architecture, the third configuration information needs to be sent from a CU to a DU by using a UE context setup request (UE CONTEXT SETUP REQUEST) or a UE context modification request (UE CONTEXT MODIFICATION REQUEST).

To ensure continuity of the service data, the access network device may further indicate a packet number of a start data packet to be transmitted on the core network side. In a possible implementation, the access network device may send a first packet number to the first core network device. The first packet number is a packet number of a last data packet that is sent to the first terminal device and that belongs to the first multicast service. Alternatively, the first packet number is a largest packet number in at least one packet number corresponding to at least one data packet buffered by the access network device, and the at least one data packet is a data packet that is to be sent to the first terminal device and that belongs to the first multicast service. The packet number may be a GTP-U serial number (SN) or a user datagram protocol (UDP)/IP data packet serial number.

The first core network device may determine, based on the first packet number, the start data packet to be sent to the first terminal device. For example, a data packet corresponding to the first packet number is used as the start data packet to be sent to the first terminal device, or a first data packet following a data packet corresponding to the first packet number is used as the start data packet to be sent to the first terminal device.

Figure 7:
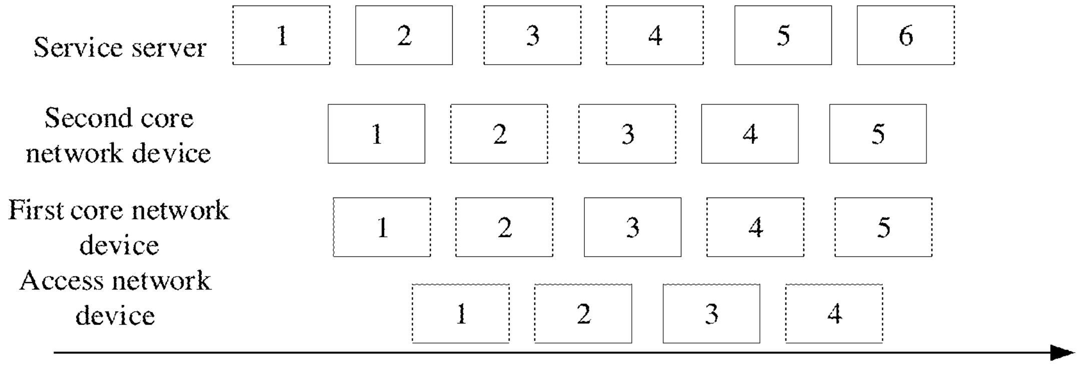
FIG. 7 is a schematic diagram of data packet transmission according to an embodiment.

For example, as shown in FIG. 7, packet numbers of data packets sent by the service server are sequentially 1, 2, 3, 4, 5, and 6; packet numbers of data packets received by the first core network device are sequentially 1, 2, 3, 4, and 5; packet numbers of data packets received by the second core network device are sequentially 1, 2, 3, 4, and 5; and packet numbers of data packets received by the access network device from the second core network device are sequentially 1, 2, 3, and 4, a packet number of a data packet sent to the terminal device is 1, and packet numbers of buffered data packets that are not sent to the terminal device are sequentially 2, 3, and 4.

When the second core network device stops transmitting the data packet, the access network device may send the packet number 1 (that is, the packet number is used as the first packet number) to the second core network device, and the second core network device continues to send the data packet to the access network device starting from the packet number 1 or the packet number 2. Alternatively, the access network device may send the packet number 4 (that is, the packet number is used as the first packet number) to the second core network device, and the second core network device continues to send the data packet to the access network device starting from the packet number 4 or the packet number 5. In another possible implementation, the access network device may indicate N to the first core network device, where Nis an integer greater than 0. When the first core network device receives the fifth information or the sixth information, or when establishment of the first data transmission channel is completed, a data packet obtained from the service server is a third data packet, and the third data packet belongs to the first multicast service. When obtaining N, the first core network device may use a second data packet that is located before the third data packet and that is at an interval of N data packets from the third data packet as the start data packet, and the start data packet to be sent by the first core network device to the first terminal device is the second data packet.

For example, if N is equal to 10, and a packet number of the third data packet is x, a data packet whose packet number is x−10 may be used as the start data packet. Alternatively, N may be independently determined by the first core network device.

In another possible implementation, the first core network device uses a second data packet that is before a third data packet and whose corresponding time interval from the third data packet is preset duration as the start data packet, and the start data packet to be sent by the first core network device to the first terminal device is the second data packet.

For example, if the third data packet is y, and the preset duration is T, a data packet that is before y and whose time interval from y is T may be used as the start data packet.

The preset duration may be configured by the access network device, the preset duration is determined by the first core network device, or the preset duration may be determined based on a first delay and a second delay, the first delay is a transmission delay between the access network device and the first core network device, and the second delay is a transmission delay between the access network device and the second core network device.

For example, the preset delay may meet the following form:

$$T=\alpha\times\text{delay1}+\beta\times\text{delay2}+A$$

Herein, T is the preset duration, α is a number greater than 0, β is a number greater than 0, delay1 is the first delay, delay2 is the second delay, and A is a preset value.

The first delay and the second delay may be indicated by the access network device to the first core network device. Alternatively, the second delay may be indicated by the access network device to the first core network device, and the first delay is calculated by the first core network device by using time information carried in a data packet received from the access network device. The time information indicates a sending time of the data packet.

To implement the functions in the methods provided in the embodiments, the access network device, the terminal device, or the communication apparatus may include a hardware structure and/or a software module, and the functions are implemented by using the hardware structure, the software module, or a combination of the hardware structure and the software module. Whether a function in the functions is performed by using the hardware structure, the software module, or the combination of the hardware structure and the software module depends on particular applications.

In the embodiments, module division is an example, and is merely logical function division. In actual implementation, another division manner may be used. In addition, functional modules in the embodiments may be integrated into one processor, or may exist alone physically, or two or more modules may be integrated into one module. The integrated module may be implemented in a form of hardware or may be implemented in a form of a software functional module.

Figure 8:
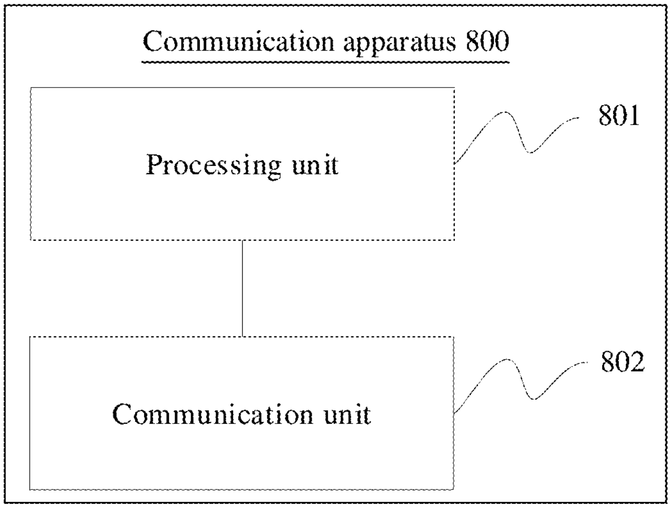
FIG. 8 is a schematic diagram of a structure of a communication apparatus according to an embodiment.

As shown in FIG. 8, an embodiment further provides a communication apparatus 800. The communication apparatus 800 may be the access network device in FIG. 1 and is configured to implement the method for the access network device in the foregoing method embodiments. Alternatively, the communication apparatus may be the core network device in FIG. 1 and is configured to implement the method corresponding to the core network device in the foregoing method embodiments. For a function, refer to the descriptions in the foregoing method embodiments.

Figure 9:
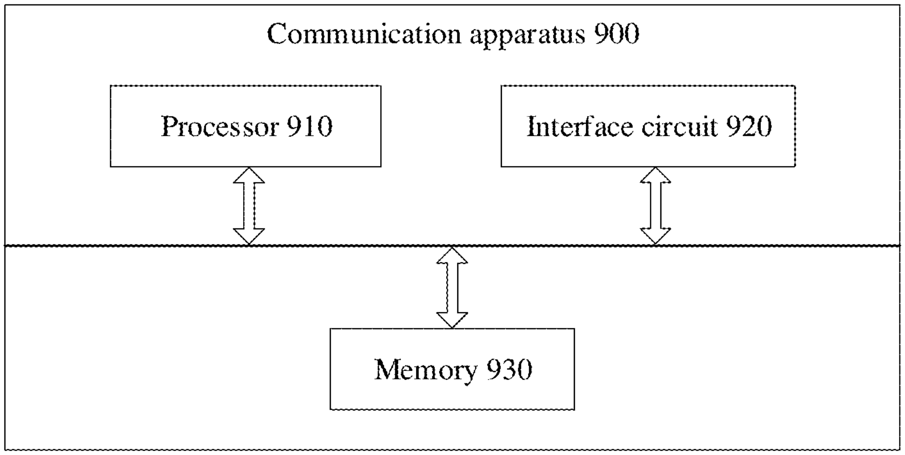
FIG. 9 is a schematic diagram of a structure of a communication apparatus according to an embodiment.

The communication apparatus 800 may include a processing unit 801 and a communication unit 802. In this embodiment, the communication unit may also be referred to as a transceiver unit and may include a sending unit and/or a receiving unit, which are respectively configured to perform sending and receiving steps of the access network device or the terminal device in the foregoing method embodiments. With reference to FIG. 8 and FIG. 9, the following describes in detail communication apparatuses provided in embodiments.

In some possible implementations, behavior and functions of the access network device in the foregoing method embodiments may be implemented by using the communication apparatus 800, for example, the method performed by the access network device in the embodiment in FIG. 5. For example, the communication apparatus 800 may be an access network device, a component (for example, a chip or a circuit) used in an access network device, or a chip or a chipset in an access network device, or a part that is of a chip and that is configured to perform a related method function. The communication unit 802 may be configured to perform a receiving or sending operation performed by the access network device in the embodiment shown in FIG. 5, and the processing unit 801 may be configured to perform an operation, other than the receiving or sending operation, performed by the access network device in the embodiment shown in FIG. 5.

The communication unit is configured to obtain first information from a first core network device, where the first information is used to request to add a first terminal device to a multicast service session corresponding to a first multicast service; and the processing unit is configured to add the first terminal device to a multicast service session corresponding to a second multicast service when a first condition is met, where the first condition includes that the first multicast service and the second multicast service are a same multicast service, and the second multicast service is provided by a second core network device.

The communication unit is further configured to send second information to the first core network device, where the second information indicates not to establish a first data transmission channel with the first core network device, and the first data transmission channel is used to transmit service data of the first multicast service.

The communication unit is further configured to send third information to the first core network device, where the third information indicates that a first data transmission channel established with the first core network device is in an inactive state, and the first data transmission channel is used to transmit service data of the first multicast service.

The communication unit is further configured to send a first user identifier to the first terminal device, where the first user identifier is used to scramble first scheduling information, and the first scheduling information is used to schedule service data of the second multicast service, where the first user identifier is the same as a second user identifier, the second user identifier is a user identifier sent to a second terminal device, and the second terminal device belongs to the second core network device.

The communication unit is further configured to send first configuration information to the first terminal device, where the first configuration information includes configuration information of a second multicast radio bearer, the second multicast radio bearer is used to transmit service data of the second multicast service to a second terminal device, and the second multicast radio bearer is further used to transmit the service data of the second multicast service to the first terminal device.

The first information includes a first identifier corresponding to the first multicast service; and that the first condition includes that the first multicast service and the second multicast service are a same multicast service includes: the first multicast service and the second multicast service are the same multicast service if the first identifier matches a second identifier corresponding to the second multicast service.

The first identifier is a first multicast service identifier corresponding to the first multicast service in the first core network device; the first identifier is a first multicast service session identifier corresponding to the first multicast service in the first core network device; the first identifier is a first internet protocol IP multicast group address or a temporary mobile group identity corresponding to the first multicast service in the first core network device; or the first identifier is an identifier corresponding to the first multicast service in a service server or another identifier allocated by a service server to the first multicast service.

The communication unit is further configured to: receive first release information from the second core network device, where the first release information indicates to release a second data transmission channel, and the second data transmission channel is used to transmit service data of the second multicast service; and send fifth information or sixth information to the first core network device, where the fifth information is used to trigger establishment of the first data transmission channel, and the sixth information is used to activate the first data transmission channel.

The first release information includes a release cause; and before the fifth information or the sixth information is sent to the first core network device, the processing unit is further configured to determine that the release cause is any one of the following: a request is made to convert the second multicast service from transmission in a multicast manner to transmission in a unicast manner; a request is made to convert the second multicast service into a unicast service; there is no terminal device that receives the service data of the second multicast service in a network corresponding to the second core network device; and a quantity of terminal devices that receive the service data of the second multicast service in the network corresponding to the second core network device is less than or equal to a threshold.

The processing unit is further configured to: establish a first multicast radio bearer corresponding to the first multicast service based on first quality of service flow information; or update a second multicast radio bearer based on first quality of service flow information, where the first multicast radio bearer is used to transmit the service data of the first multicast service to the first terminal device, and the first quality of service flow information is from the first core network device; and the second multicast radio bearer is used to transmit the service data of the second multicast service to the second terminal device, and an updated second multicast radio bearer is used to transmit the service data of the first multicast service to the first terminal device.

The communication unit is further configured to send third configuration information to the first terminal device, where the third configuration information includes a third user identifier, the third user identifier is used to scramble second scheduling information, and the second scheduling information is used to schedule the service data of the first multicast service.

The third configuration information further includes configuration information of the first multicast radio bearer.

The communication unit is further configured to send a first packet number to the first core network device, where the first packet number is a packet number of a last data packet that is sent to the first terminal device and that belongs to the first multicast service, or the first packet number is a largest packet number in at least one packet number corresponding to at least one buffered data packet, and the at least one data packet is a data packet that is to be sent to the first terminal device and that belongs to the first multicast service.

The communication unit is further configured to receive a data packet that belongs to the first multicast service from the first core network device, where a start data packet in the received data packet is a second data packet; and there is an interval of N data packets between the second data packet and a third data packet, the third data packet is a data packet obtained from a service server when the first core network device receives the fifth information or the sixth information, and Nis an integer greater than 0; or a corresponding time interval between the second data packet and a third data packet is preset duration.

The preset duration is configured by the access network device, the preset duration is determined by the first core network device, or the preset duration is determined based on a first delay and a second delay, the first delay is a transmission delay between the access network device and the first core network device, and the second delay is a transmission delay between the access network device and the second core network device.

The communication unit is configured to: send first information to an access network device, where the first information is used to request to add a first terminal device to a multicast service session corresponding to a first multicast service; and receive second information or third information from the access network device when the first terminal device joins a multicast service session corresponding to a second multicast service, where the first multicast service and the second multicast service are a same multicast service, and the second multicast service is provided by a second core network device; the second information indicates not to establish a first data transmission channel with the first core network device, and the first data transmission channel is used to transmit service data of the first multicast service; and the third information indicates that the first data transmission channel established with the first core network device is in an inactive state, and the first data transmission channel is used to transmit the service data of the first multicast service.

The communication unit is further configured to receive fifth information or sixth information from the access network device, where the fifth information is used to trigger establishment of the first data transmission channel, and the sixth information is used to activate the first data transmission channel.

The communication unit is further configured to: receive a first packet number from the access network device, where the first packet number is a packet number of a last data packet that is sent by the access network device to the first terminal device and that belongs to the first multicast service, or the first packet number is a largest packet number in at least one packet number corresponding to at least one data packet buffered by the access network device, and the at least one data packet is a data packet that is to be sent to the first terminal device and that belongs to the first multicast service; and use a data packet corresponding to the first packet number as a start data packet to be sent to the first terminal device.

The communication unit is further configured to send a data packet that belongs to the first multicast service to the access network device, where a start data packet in the data packet is a second data packet; and there is an interval of N data packets between the second data packet and a third data packet, the third data packet is a data packet obtained from a service server when the first core network device receives the fifth information or the sixth information, and N is an integer greater than 0; or a corresponding time interval between the second data packet and a third data packet is preset duration.

The preset duration is configured by the access network device, the preset duration is determined by the first core network device, or the preset duration is determined based on a first delay and a second delay, the first delay is a transmission delay between the access network device and the first core network device, and the second delay is a transmission delay between the access network device and the second core network device.

The foregoing is merely an example. The processing unit 801 and the communication unit 802 may further perform other functions. For more detailed descriptions, refer to the related descriptions in the method embodiment shown in FIG. 5. Details are not described herein.

FIG. 9 shows a communication apparatus 900 according to an embodiment. The communication apparatus shown in FIG. 9 may be an implementation of a hardware circuit of the communication apparatus shown in FIG. 8. The communication apparatus is applicable to the foregoing flowcharts and performs functions of the terminal device or the access network device in the foregoing method embodiments. For ease of description, FIG. 9 shows only main components of the communication apparatus.

As shown in FIG. 9, the communication apparatus 900 includes a processor 910 and an interface circuit 920. The processor 910 and the interface circuit 920 are coupled to each other. It may be understood that the interface circuit 920 may be a transceiver or an input/output interface. Optionally, the communication apparatus 900 may further include a memory 930, configured to store instructions to be executed by the processor 910, or store input data required by the processor 910 to run instructions, or store data generated after the processor 910 runs instructions.

When the communication apparatus 900 is configured to implement the method shown in FIG. 5, the processor 910 is configured to implement a function of the processing unit 801, and the interface circuit 920 is configured to implement a function of the communication unit 802.

When the communication apparatus is a chip used in a terminal device, the chip in the terminal device implements a function of the terminal device in the foregoing method embodiments. The chip in the terminal device receives information from another module (for example, a radio frequency module or an antenna) in the terminal device, where the information is sent by an access network device to the terminal device. Alternatively, the chip in the terminal device sends information to another module (for example, a radio frequency module or an antenna) in the terminal device, where the information is sent by the terminal device to an access network device.

When the communication apparatus is a chip used in an access network device, the chip in the access network device implements a function of the access network device in the foregoing method embodiments. The chip in the access network device receives information from another module (for example, a radio frequency module or an antenna) in the access network device, where the information is sent by a terminal device to the access network device. Alternatively, the chip in the access network device sends information to another module (for example, a radio frequency module or an antenna) in the access network device, where the information is sent by the access network device to a terminal device.

It may be understood that the processor in the embodiments may be a central processing unit (CPU), or may be another general-purpose processor, a digital signal processor (DSP), an application-specific integrated circuit (ASIC), a field programmable gate array (FPGA) or another programmable logic device, or a transistor logic device. The general-purpose processor may be a microprocessor or any conventional processor.

The memory in the embodiments may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, or any other form of storage medium well known in the art. For example, a storage medium is coupled to a processor, so that the processor can read information from the storage medium and write information into the storage medium. The storage medium may be a component of the processor. The processor and the storage medium may be located in an ASIC. In addition, the ASIC may be located in an access network device or a terminal device. Alternatively, the processor and the storage medium may exist in the access network device or the terminal device as discrete components.

A person skilled in the art should understand that the embodiments may be provided as a method, a system, or a computer program product. Therefore, there may be hardware only embodiments, software only embodiments, or embodiments with a combination of software and hardware.

In addition, a computer program product may be implemented on one or more computer-usable storage media (including, but not limited to, a disk memory, an optical memory, and the like) that include computer-usable program code.

The embodiments may be described with reference to the flowcharts and/or the block diagrams of the method, the device (system), and the computer program product. It should be understood that each procedure and/or block in the flowcharts and/or the block diagrams and a combination of procedures and/or blocks in the flowcharts and/or the block diagrams may be implemented by using computer program instructions. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more procedures in the flowcharts and/or in one or more blocks in the block diagrams.

Alternatively, these computer program instructions may be stored in a non-transitory computer-readable memory that can indicate a computer or another programmable data processing device to work in a manner, so that the instructions stored in the non-transitory computer-readable memory generate an artifact that includes an instruction apparatus. The instruction apparatus implements a function in one or more procedures in the flowcharts and/or in one or more blocks in the block diagrams.

A person skilled in the art may make various modifications and variations without departing from the scope of the embodiments. This embodiments are intended to cover these modifications and variations.

What is claimed is:

1. A method, applied to an access network device, the method comprising:

obtaining first information from a first core network device, wherein the first information is used to request to add a first terminal device to a multicast service session corresponding to a first multicast service;

adding the first terminal device to a multicast service session corresponding to a second multicast service when a first condition is met, wherein the first condition comprises that the first multicast service and the second multicast service are a same multicast service, and the second multicast service is provided by a second core network device; and the method further comprising:

sending second information to the first core network device, wherein the second information indicates not to establish a first data transmission channel with the first core network device, and the first data transmission channel is used to transmit service data of the first multicast service;

wherein the first release information comprises a release cause; and the release cause is any one of the following:

a request is made to convert the second multicast service from transmission in a multicast manner to transmission in a unicast manner;

a request is made to convert the second multicast service into a unicast service;

there is no terminal device that receives the service data of the second multicast service in a network corresponding to the second core network device; and a quantity of terminal devices that receive the service data of the second multicast service in the network corresponding to the second core network device is less than or equal to a threshold.

2. The method according to claim 1, further comprising:

sending third information to the first core network device, wherein the third information indicates that a first data transmission channel established with the first core network device is in an inactive state, and the first data transmission channel is used to transmit service data of the first multicast service.

3. The method according to claim 1, further comprising:

sending a first user identifier to the first terminal device, wherein the first user identifier is used to scramble first scheduling information, and the first scheduling information is used to schedule service data of the second multicast service, wherein the first user identifier is the same as a second user identifier, the second user identifier is a user identifier sent to a second terminal device, and the second terminal device belongs to the second core network device.

4. The method according to claim 1, further comprising:

sending first configuration information to the first terminal device, wherein the first configuration information comprises configuration information of a second multicast radio bearer, the second multicast radio bearer is used to transmit service data of the second multicast service to a second terminal device, and the second multicast radio bearer is further used to transmit the service data of the second multicast service to the first terminal device.

5. The method according to claim 1, wherein the first information comprises a first identifier corresponding to the first multicast service; and that the first condition comprises that the first multicast service and the second multicast service are the same multicast service further comprises:

the first identifier matches a second identifier corresponding to the second multicast service.

6. The method according to claim 5, wherein the first identifier is a first multicast service identifier corresponding to the first multicast service in the first core network device;

the first identifier is a first multicast service session identifier corresponding to the first multicast service in the first core network device;

the first identifier is a first internet protocol IP multicast group address or a temporary mobile group identity corresponding to the first multicast service in the first core network device; or the first identifier is an identifier corresponding to the first multicast service in a service server or another identifier allocated by a service server to the first multicast service.

7. The method according to claim 1, wherein the first release information comprises a release cause; and the release cause is any one of the following:

a request is made to convert the second multicast service from transmission in a multicast manner to transmission in a unicast manner;

a request is made to convert the second multicast service into a unicast service;

there is no terminal device that receives the service data of the second multicast service in a network corresponding to the second core network device; and a quantity of terminal devices that receive the service data of the second multicast service in the network corresponding to the second core network device is less than or equal to a threshold.

8. The method according to claim 1, further comprising:

establishing a first multicast radio bearer corresponding to the first multicast service based on first quality of service flow information; or updating a second multicast radio bearer based on first quality of service flow information, wherein the first multicast radio bearer is used to transmit the service data of the first multicast service to the first terminal device, and the first quality of service flow information is from the first core network device; and a second multicast radio bearer is used to transmit the service data of the second multicast service to the second terminal device, and an updated second multicast radio bearer is used to transmit the service data of the first multicast service to the first terminal device.

9. The method according to claim 8, further comprising:

sending third configuration information to the first terminal device, wherein the third configuration information comprises a third user identifier, the third user identifier is used to scramble second scheduling information, and the second scheduling information is used to schedule the service data of the first multicast service.

10. The method according to claim 9, wherein the third configuration information further comprises configuration information of the first multicast radio bearer.

11. The method according to claim 1, further comprising:

sending a first packet number to the first core network device, wherein the first packet number is a packet number of a last data packet that is sent to the first terminal device and that belongs to the first multicast service, or the first packet number is a largest packet number in at least one packet number corresponding to at least one buffered data packet, and the at least one data packet is a data packet that is to be sent to the first terminal device and that belongs to the first multicast service.

12. The method according to claim 1, further comprising:

receiving a data packet that belongs to the first multicast service from the first core network device, wherein a start data packet in the received data packet is a second data packet; and there is an interval of N data packets between the second data packet and a third data packet, the third data packet is a data packet obtained from a service server when the first core network device receives the fifth information or the sixth information, and Nis an integer greater than 0; or a corresponding time interval between the second data packet and a third data packet is preset duration.

13. A method, applied to a first core network device, the method comprising:

sending first information to an access network device, wherein the first information is used to request to add a first terminal device to a multicast service session corresponding to a first multicast service; and receiving second information or third information from the access network device when the first terminal device joins a multicast service session corresponding to a second multicast service, wherein the first multicast service and the second multicast service are a same multicast service, and the second multicast service is provided by a second core network device; the second information indicates not to establish a first data transmission channel with the first core network device, and the first data transmission channel is used to transmit service data of the first multicast service; and the third information indicates that the first data transmission channel established with the first core network device is in an inactive state, and the first data transmission channel is used to transmit the service data of the first multicast service; and the method further comprising:

receiving a first packet number from the access network device, wherein the first packet number is a packet number of a last data packet that is sent by the access network device to the first terminal device and that belongs to the first multicast service, or the first packet number is a largest packet number in at least one packet number corresponding to at least one data packet buffered by the access network device, and the at least one data packet is a data packet that is to be sent to the first terminal device and that belongs to the first multicast service; and using a data packet corresponding to the first packet number as a start data packet to be sent to the first terminal device.

14. The method according to claim 13, further comprising:

receiving fifth information or sixth information from the access network device, wherein the fifth information is used to trigger establishment of the first data transmission channel, and the sixth information is used to activate the first data transmission channel.

15. The method according to claim 13, further comprising:

sending a data packet that belongs to the first multicast service to the access network device, wherein a start data packet in the data packet is a second data packet; and there is an interval of N data packets between the second data packet and a third data packet, the third data packet is a data packet obtained from a service server when the first core network device receives the fifth information or the sixth information, and N is an integer greater than 0; or a corresponding time interval between the second data packet and a third data packet is preset duration.

16. The method according to claim 15, wherein the preset duration is configured by the access network device, the preset duration is determined by the first core network device, or the preset duration is determined based on a first delay and a second delay, the first delay is a transmission delay between the access network device and the first core network device, and the second delay is a transmission delay between the access network device and the second core network device.

17. A communication apparatus, comprising a processor, wherein the processor is coupled to a memory; and the processor is configured to execute a computer program or instructions stored in the memory, to enable the communication apparatus to implement the method according to claim 1.

18. A method, applied to a first core network device, the method comprising:

sending first information to an access network device, wherein the first information is used to request to add a first terminal device to a multicast service session corresponding to a first multicast service; and receiving second information or third information from the access network device when the first terminal device joins a multicast service session corresponding to a second multicast service, wherein the first multicast service and the second multicast service are a same multicast service, and the second multicast service is provided by a second core network device; the second information indicates not to establish a first data transmission channel with the first core network device, and the first data transmission channel is used to transmit service data of the first multicast service; and the third information indicates that the first data transmission channel established with the first core network device is in an inactive state, and the first data transmission channel is used to transmit the service data of the first multicast service; and the method further comprising:

receiving fifth information or sixth information from the access network device, wherein the fifth information is used to trigger establishment of the first data transmission channel, and the sixth information is used to activate the first data transmission channel.

* * * * *